(12) United States Patent
Crimins et al.

(10) Patent No.: US 10,248,092 B2
(45) Date of Patent: Apr. 2, 2019

(54) ARCHITECTURE FOR THERMOSTAT CONTROL DURING PEAK INTERVALS

(71) Applicant: Google LLC, Mountain View, CA (US)

(72) Inventors: Jonathan Crimins, Los Altos, CA (US); Scott Ruffner, San Francisco, CA (US); Allen Minich, Mountain View, CA (US); Todd Hester, London (GB); Amanda Sahl, Palo Alto, CA (US); Praveen Subramani, San Francisco, CA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 15/187,565

(22) Filed: Jun. 20, 2016

(65) Prior Publication Data

US 2017/0363312 A1    Dec. 21, 2017

(51) Int. Cl.
| | |
|---|---|
| *F24F 11/00* | (2018.01) |
| *G05B 19/042* | (2006.01) |
| *F24F 11/30* | (2018.01) |
| *F24F 140/50* | (2018.01) |
| *F24F 140/60* | (2018.01) |
| *F24F 11/62* | (2018.01) |
| *F24F 11/46* | (2018.01) |
| *F24F 11/52* | (2018.01) |

(52) U.S. Cl.
CPC ............ *G05B 19/042* (2013.01); *F24F 11/30* (2018.01); *F24F 11/46* (2018.01); *F24F 11/52* (2018.01); *F24F 11/62* (2018.01); *F24F 2140/50* (2018.01); *F24F 2140/60* (2018.01); *G05B 2219/2614* (2013.01)

(58) Field of Classification Search
CPC .. F24F 11/30; F24F 11/46; F24F 11/52; F24F 11/62; F24F 2140/50; F24F 2140/60; G05B 19/042; G05B 2219/2614
See application file for complete search history.

(56) References Cited

U.S. PATENT DOCUMENTS

| | | | | |
|---|---|---|---|---|
| 7,565,225 B2 * | 7/2009 | Dushane | .............. | G05B 19/042 700/276 |
| 8,091,795 B1 * | 1/2012 | McLellan | .......... | G05D 23/1923 236/51 |
| 8,185,245 B2 * | 5/2012 | Amundson | ............ | G06Q 10/00 700/277 |

(Continued)

*Primary Examiner* — Abdelmoniem I Elamin
(74) *Attorney, Agent, or Firm* — Kilpatrick Townsend & Stockton LLP

(57) ABSTRACT

A thermostat may include one or more memory devices comprising a stored setpoint schedule, one or more temperature sensors configured to provide temperature sensor measurements, and a processing system configured to be in operative communication the one or more memory devices to determine a setpoint temperature, and in still further operative communication with a heating, ventilation, and air conditioning (HVAC) system to control the HVAC system based at least in part on the setpoint temperature and the temperature sensor measurements. The processing system may be configured to control the HVAC system by receiving an indication that a total instantaneous energy usage rate for a structure in which the thermostat is installed is projected to exceed a threshold amount; and altering the stored setpoint schedule to reduce an energy usage rate of the HVAC system.

20 Claims, 22 Drawing Sheets

(56) References Cited

U.S. PATENT DOCUMENTS

| | | | |
|---|---|---|---|
| 2009/0018673 A1* | 1/2009 | Dushane | G05B 19/042 |
| | | | 700/9 |
| 2011/0035061 A1* | 2/2011 | Altonen | E06B 9/68 |
| | | | 700/278 |
| 2011/0153525 A1* | 6/2011 | Benco | G01S 5/0027 |
| | | | 705/412 |
| 2011/0238224 A1* | 9/2011 | Schnell | G06Q 50/06 |
| | | | 700/278 |
| 2012/0053739 A1* | 3/2012 | Brian | G06F 1/3203 |
| | | | 700/287 |
| 2012/0091804 A1* | 4/2012 | Altonen | E06B 9/68 |
| | | | 307/31 |
| 2015/0120075 A1* | 4/2015 | Le Roux | G01D 4/004 |
| | | | 700/296 |
| 2016/0069599 A1* | 3/2016 | Izadi-Zamanabadi | F25B 5/00 |
| | | | 62/115 |
| 2016/0266181 A1* | 9/2016 | Kawaguchi | G01R 21/133 |
| 2016/0298868 A1* | 10/2016 | Shiflet | G05D 23/1923 |

\* cited by examiner

1202

| Enroll Structure in Program by Device |
|---|
| POST /api/partner/v1/programs/<program-instanceid>/structures/enroll_by_device |
| Inputs: device_serial_number, terms_of_service_acceptance_time |
| Outputs: structure-id |
| Errors: STRUCTURE_NOT_FOUND, STRUCTURE _NOT_ENROLLED |

1204

| Unenroll Structure in Program |
|---|
| DELETE /api/partner/v1/programs/<program-instance-id>/structures/<structureid> |
| Errors: STRUCTURE_NOT_FOUND, STRUCTURE _NOT_ENROLLED |

1206

| Set HVAC Capacities for a Device |
|---|
| PUT /api/energy/v1/structures/<structure-id>/devices/<deviceid>/hvac_capacities |
| Inputs: structure_id, device_serial_number, cooling_capacity(...), primary_heating_capacity(...), secondary_heating_capacity(...), fan_efficiency |
| Errors: STRUCTURE_NOT_FOUND |

| Create Demand Charge Event |
|---|
| POST /api/energy/v1/demand_charge_events |
| Inputs: sturcture_id, estimated_savingintervals[start_time, end_time, min_energy, max_energy] |
| Outputs: demand_charge_event_id |
| Errors: INVALID_INTERVALS |

1304

| Get Demand Charge Event |
|---|
| GET /api/energy/v1/demand_charge_events/<demand-charge-event-id> |
| Outputs: structure_id, estimated_savings, end_time_of_intervals, evaluated, evaluation_result, statusintervals[status, end_time, min_energy, max_energy] |
| Errors: DEMAND_CHARGE_NOT_FOUND |

1306

| Cancel Demand Charge Event |
|---|
| DELETE /api/energy/v1/demand_charge_events/<demand-charge-event-id> |
| Errors: DEMAND_CHARGE_NOT_FOUND |

FIG. 13

ARCHITECTURE FOR THERMOSTAT CONTROL DURING PEAK INTERVALS

BACKGROUND

Some residential rate structures allow for one-time charges to be levied on residential customers when their peak power consumption exceeds certain thresholds in a given time window over monthly cycle. Residential demand charges can often be based on the highest 15-minute average usage recorded on a customer's meter within a given month. If a customer's home uses a large amount of power over short periods, a demand charges can comprise a larger part of that customer's bill. In other cases, there are regulations or physical limitations on the amount/ability to push excess power generated from on-site solar, for example back onto the broader electrical grid, either for monetization or relief. In these circumstances, there is no easy, automated way, for a customer to manage for these peaks and the customer can end up with materially negative effects to their utility bill.

The problem is that customers have no easy or automated way of changing their consumption pattern to adapt to peak demand charges through the course of a day. Typically, users have no idea when their total household power consumption is about to cross an instantaneous threshold that will incur extra charges. Because demand charges are based on total instantaneous household consumption, there is no one thing that consumers can do to automatically reduce power consumption in real time as would be required to avoid extra cost. Utilities want to encourage more of their customers to be conscientious of peak demand charges plans because it more closely associates the cost to generate electricity with the rate the customer is paying. It also helps alleviate power demands from power grids in the demand-heavy hours of the day. Key challenges of enabling adoption of these plans include helping customers (1) understand the implication of using a peak demand charge plan, (2) adjust their consumption pattern to align with the customer's specific plan, and (3) manage energy usage within that peak demand plan to automatically adapt to short energy changes.

BRIEF SUMMARY

In some embodiments, a thermostat may include a housing; one or more memory devices comprising a stored setpoint schedule, where the stored setpoint schedule comprises a plurality of setpoints; one or more temperature sensors, where each may be configured to provide temperature sensor measurements; and a processing system disposed within the housing, the processing system being configured to be in operative communication with the one or more temperature sensors to receive the temperature sensor measurements, in operative communication with the one or more memory devices to determine a setpoint temperature, and in still further operative communication with a heating, ventilation, and air conditioning (HVAC) system to control the HVAC system based at least in part on the setpoint temperature and the temperature sensor measurements. The processing system may be programmed or configured to control the HVAC system by performing operations including receiving an indication that a total instantaneous energy usage rate for a structure in which the thermostat is installed is projected to exceed a threshold amount. The operations may also include altering the stored setpoint schedule to reduce an energy usage rate of the HVAC system in response to receiving the indication that the total instantaneous energy usage rate for the structure in which the thermostat is installed is projected to exceed the threshold amount.

A method of using a thermostat to control an HVAC system may include storing a stored setpoint schedule in one or more memory devices, where the stored setpoint schedule may include a plurality of setpoints. The method may additionally include receiving temperature sensor measurements from one or more temperature sensors, and controlling an air conditioning (HVAC) system based at least in part on the stored setpoint schedule and the temperature sensor measurements. The method may further include receiving an indication that a total instantaneous energy usage rate for a structure in which the thermostat is installed is projected to exceed a threshold amount. The method may also include altering the stored setpoint schedule to reduce an energy usage rate of the HVAC system in response to receiving the indication that the total instantaneous energy usage rate for the structure in which the thermostat is installed is projected to exceed the threshold amount.

In any of the embodiments described herein, any of the following features may be included in any combination and without limitation. The indication that the total instantaneous energy usage rate for the structure in which the thermostat is installed is projected to exceed the threshold amount may include a time interval defined by a start time and an end time during which the total instantaneous energy usage rate is projected to exceed the threshold amount. The method/operations may include receiving a request to reduce the total instantaneous energy usage rate for the structure by a specified amount during the time interval, determining whether the thermostat can reduce the total instantaneous energy usage rate for the structure by the specified amount during the time interval by multiplying an HVAC capacity by an amount of time during the time interval that the HVAC system can be turned off; and sending a response indicating whether the thermostat can reduce the total instantaneous energy usage rate for the structure by the specified amount during the time interval. The response indicating whether the thermostat can reduce the total instantaneous energy usage rate for the structure may include an indication that the thermostat can reduce the total instantaneous energy usage rate for the structure without affecting user comfort. The response indicating whether the thermostat can reduce the total instantaneous energy usage rate for the structure may include an indication that the thermostat can reduce the total instantaneous energy usage rate for the structure but only while affecting user comfort. The method/operations may also include minimizing a cost equation comprising a plurality of cost factors to determine whether the thermostat can reduce the total instantaneous energy usage rate for the structure by the specified amount during the time interval. One of the plurality of cost factors may represent a user comfort factor that is stored locally at the thermostat, and received through a user interface of the thermostat. One of the plurality of cost factors may include an additional cost that is incurred for exceeding the threshold amount. The method/operations may further include receiving input from a user that increases the instantaneous energy usage of the HVAC system; and removing any alterations made to the stored setpoint schedule in response to receiving the indication that the total instantaneous energy usage rate for the structure in which the thermostat is installed is projected to exceed the threshold amount. The indication that the total instantaneous energy usage rate for the structure in which the thermostat is installed is projected to exceed a threshold amount may be received from a thermostat management server. The indication that the total instantaneous energy usage rate for the structure in which the thermostat is installed is projected to exceed a threshold amount may originate with a utility provider, and is transmitted to a thermostat management server via a custom application programming interface (API). The utility provider may be a solar panel provider, where the utility provider may have installed one or more solar panels at a structure in which the thermostat is installed. The method/operations may additionally include receiving, from the thermostat management server, an HVAC capacity, where the HVAC capacity may be measured by the solar panel provider when the solar panels are installed at the structure. The total instantaneous energy usage rate for a structure may be measured by a meter coupled to the solar panels. The method/operations may also include displaying a first graphic on a user interface of the thermostat indicating that a thermostat feature is available to prevent the total instantaneous energy usage rate for the structure from exceeding the threshold amount. The method/operations may additionally include displaying a second graphic on the user interface of the thermostat indicating that the thermostat feature is currently active to prevent the total instantaneous energy usage rate for the structure from exceeding the threshold amount.

BRIEF DESCRIPTION OF THE DRAWINGS

FIG. 12 illustrates interface definitions for the API provided to the utility provider by the thermostat management server that can be used to enroll structures and define demand charge rate plans, according to some embodiments.

FIG. 13 illustrates interface definitions for the API provided to the utility provider by the thermostat management server that can be used to define, maintain, and/or update real-time demand charge events for various structures, according to some embodiments.

DETAILED DESCRIPTION OF THE INVENTION

Figure 1:
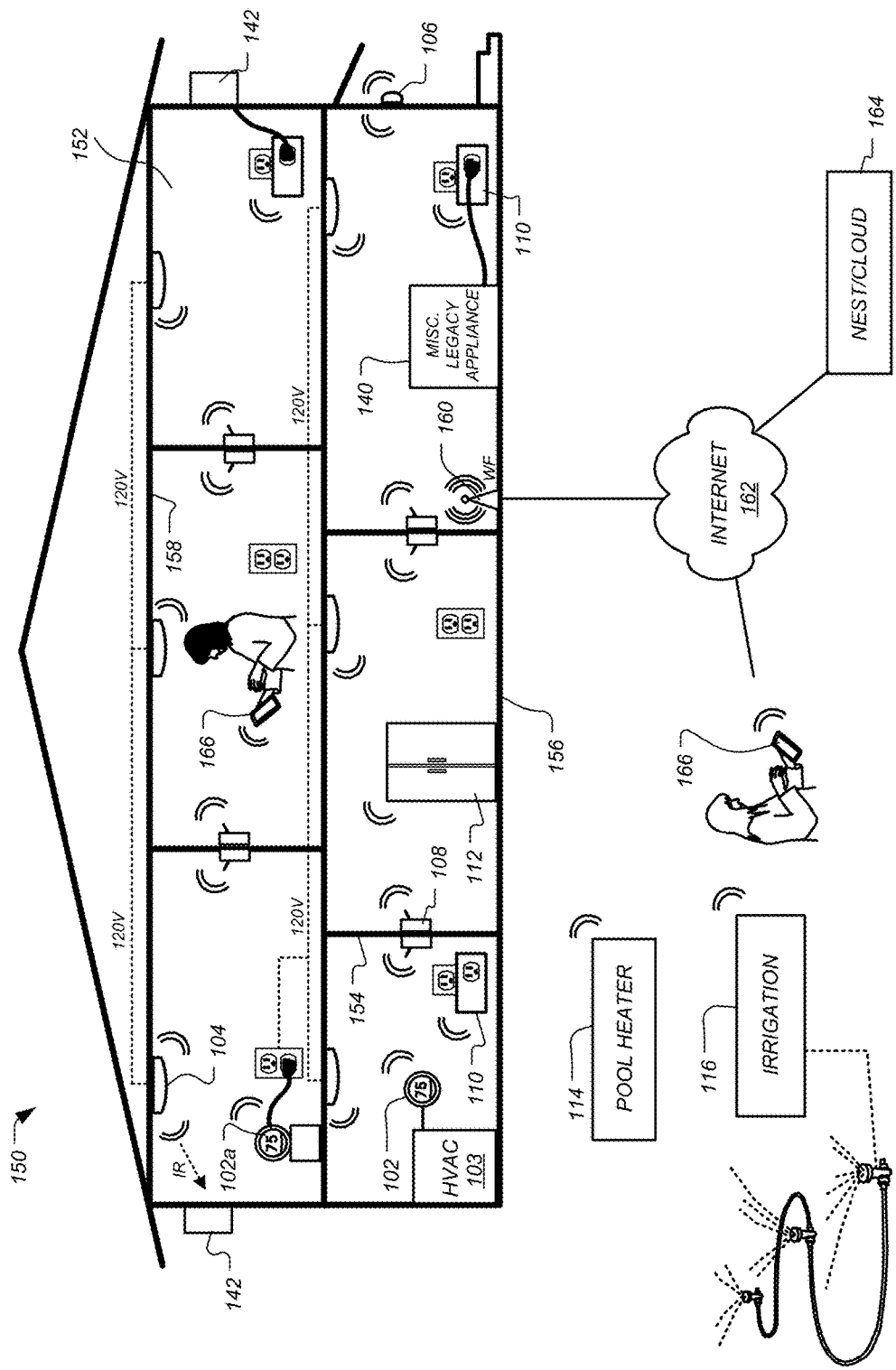
FIG. 1 illustrates an example of a smart home environment within which one or more of the devices, methods, systems, services, and/or computer program products described further herein can be applicable.

The subject matter of this patent specification relates to the subject matter of the following commonly assigned application, filed on the same day as the present application, which is incorporated by reference herein:

U.S. patent application Ser. No. 15/187,562, filed on Jun. 20, 2016, entitled "Architecture for Thermostat Control during Time-of-Use Intervals," by Greene et al.

The Smart-Home Environment

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
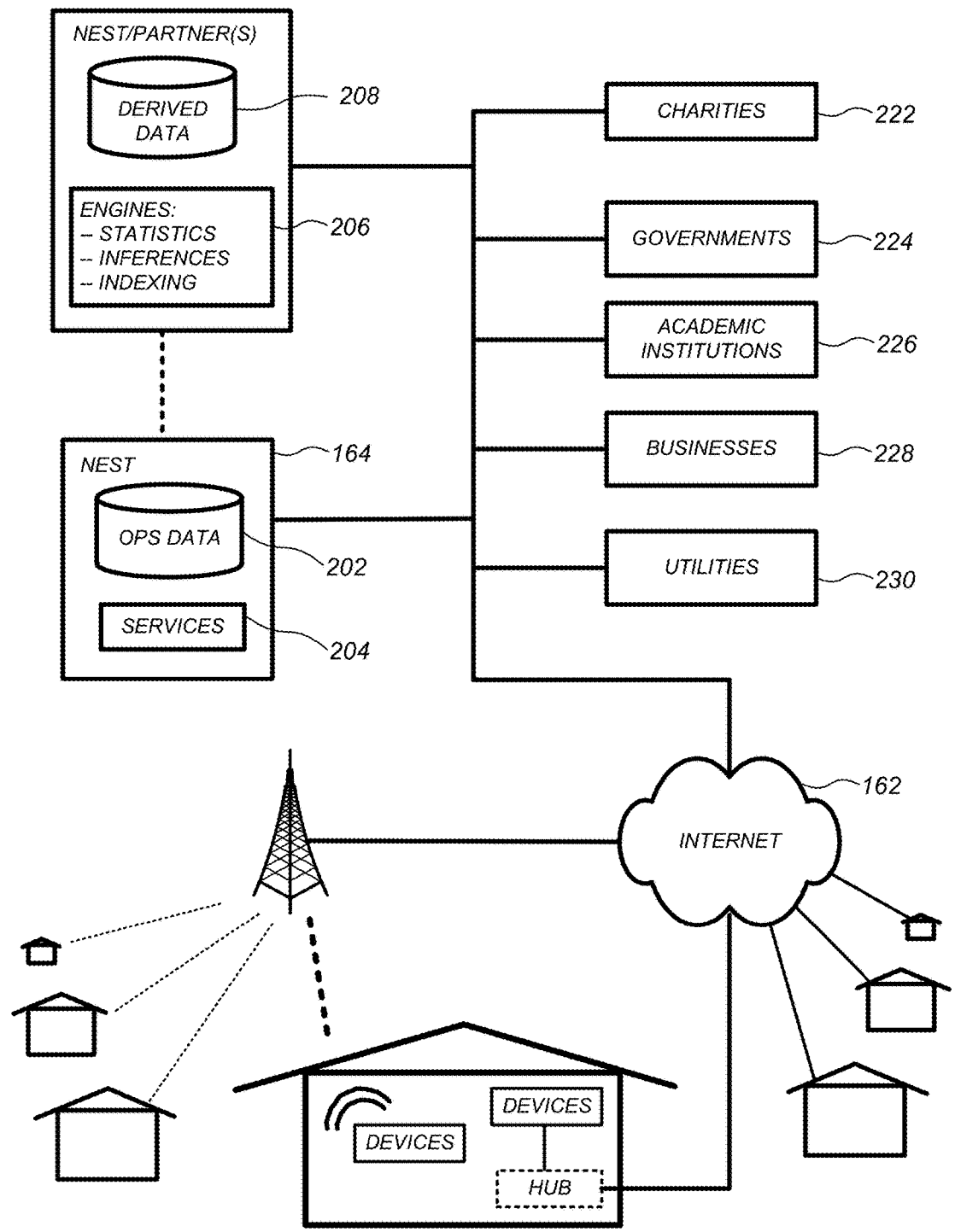
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
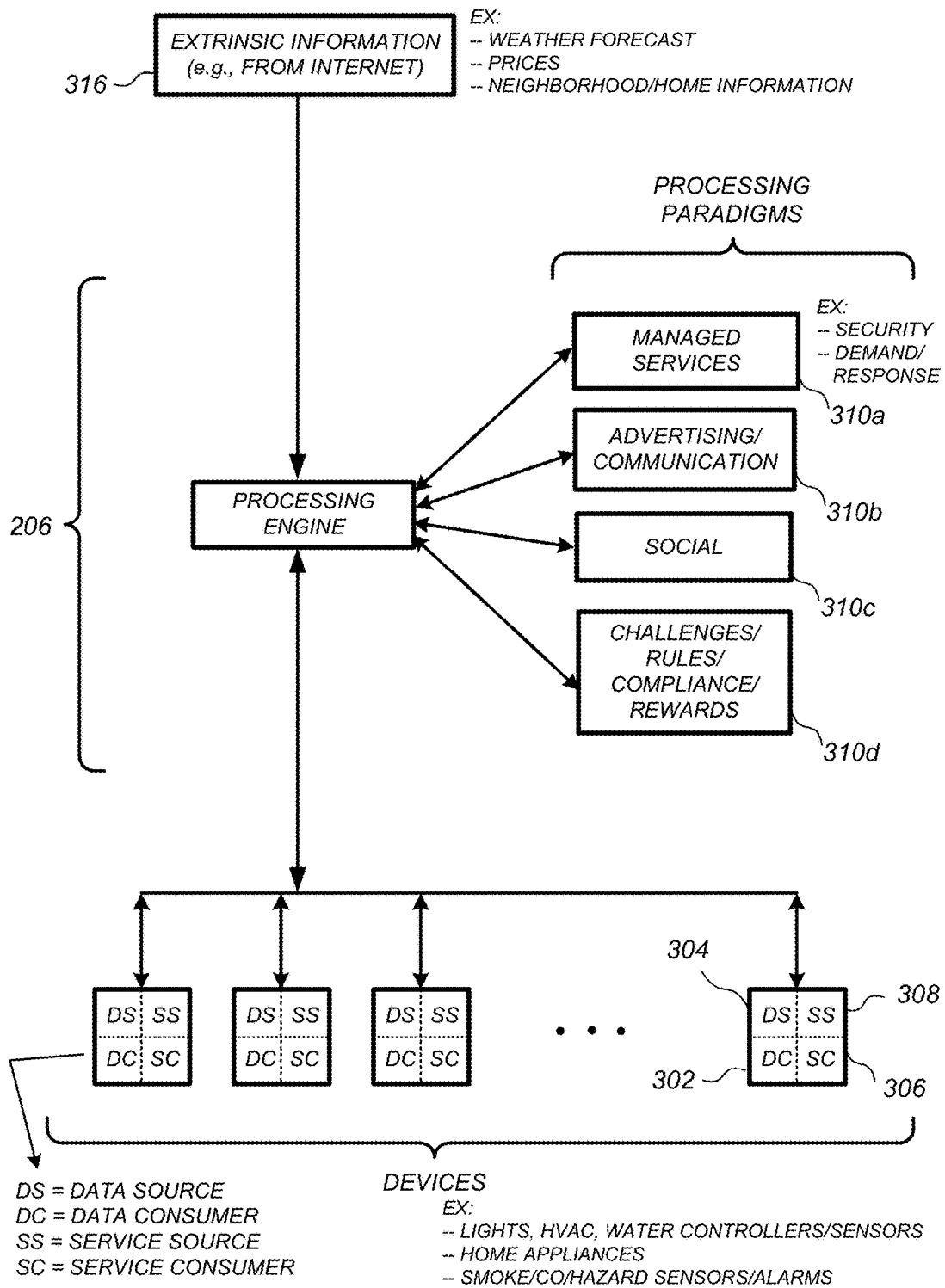
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4:
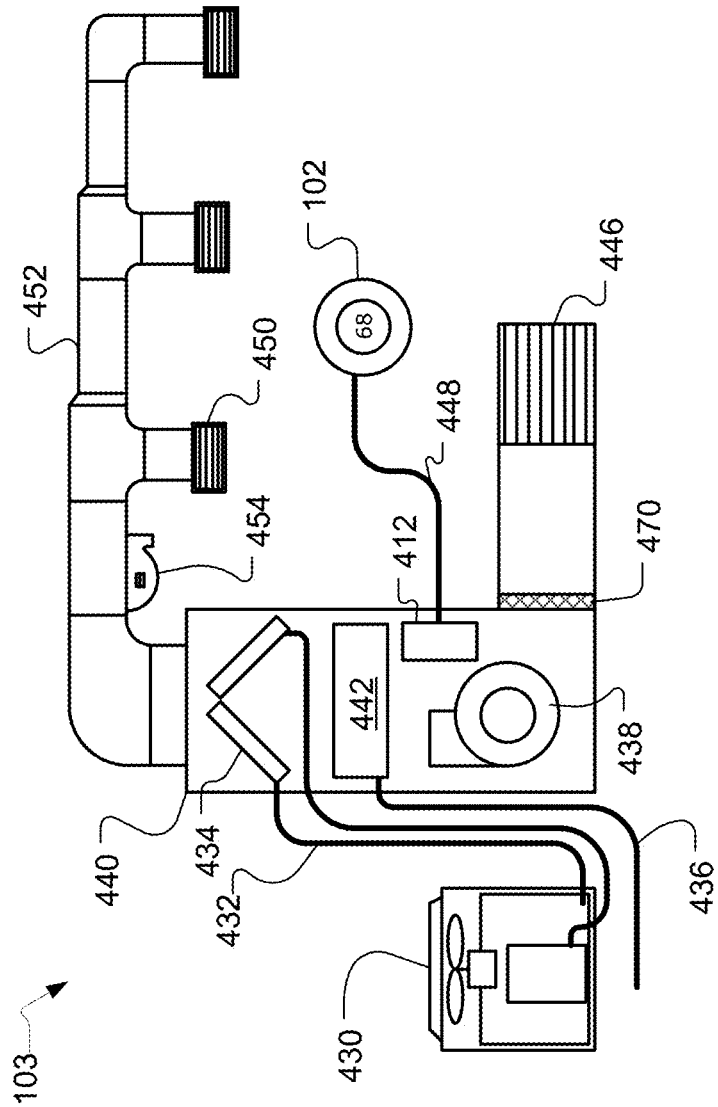
FIG. 4 illustrates a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

The Smart-Home Thermostat

Figure 5A:
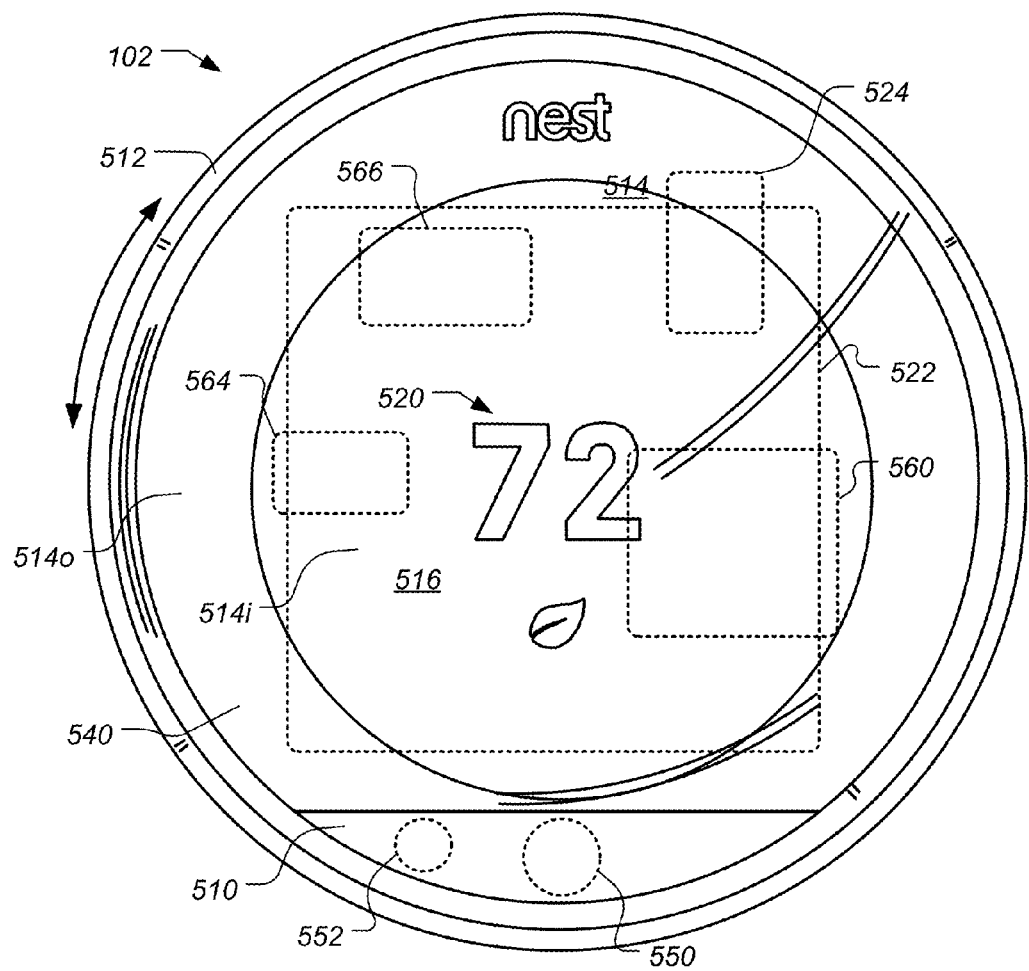
FIG. 5A-5B illustrate a thermostat having a visually pleasing, smooth, sleek and rounded exterior appearance while at the same time including one or more sensors for detecting occupancy and/or users, according to some embodiments.
Figure 5B:
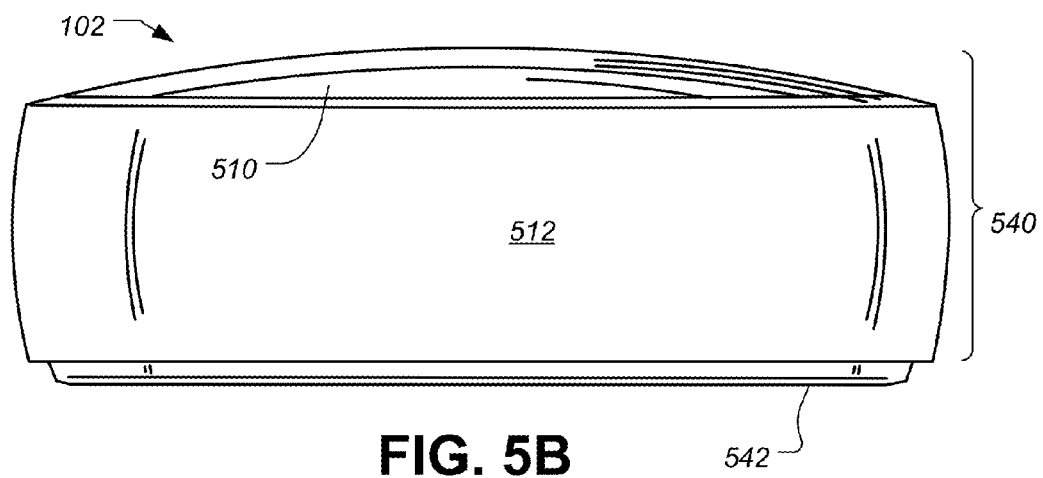

FIGS. 5A-5B illustrate a thermostat having a rounded exterior appearance and including one or more sensors for detecting environmental conditions, such as occupancy and/or users, temperature, ambient light, humidity, and so forth. FIG. 5A is front view, and FIG. 5B is a bottom elevation view of thermostat 102. Unlike many prior art thermostats, thermostat 102 has a simple and elegant design. Moreover, user interaction with thermostat 102 is facilitated and greatly enhanced over known conventional thermostats. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 has a large convex rounded front face lying inside the outer rotatable ring 512. According to some embodiments, thermostat 102 is approximately 84 mm in diameter and protrudes from the wall, when wall mounted, by 30 mm. The outer rotatable ring 512 allows the user to make adjustments, such as selecting a new setpoint temperature. For example, by rotating the outer ring 512 clockwise, the real-time (i.e. currently active) setpoint temperature can be increased, and by rotating the outer ring 512 counter-clockwise, the real-time setpoint temperature can be decreased.

The front face of the thermostat 102 comprises a cover 514 that according to some embodiments is polycarbonate, and a lens 510 having an outer shape that matches the contours of the curved outer front face of the thermostat 102.

According to some embodiments, Fresnel lens elements may are formed on the interior surface of the lens 510 such that they are not obviously visible by viewing the exterior of the thermostat 102. Behind the lens 510 is a passive infrared (PIR) sensor 550 for detecting occupancy, a temperature sensor that is thermally coupled to the lens 510, and a multi-channel thermopile for detecting occupancy, user approaches, and motion signatures. The Fresnel lens elements of the lens 510 are made from a high-density polyethylene (HDPE) that has an infrared transmission range appropriate for sensitivity to human bodies. The lens 510 may also include thin sections that allow a near-field proximity sensor 552, such as a multi-channel thermopile, and a temperature sensor to "see-through" the lens 510 with minimal interference from the polyethylene. As shown in FIGS. 5A-5B, the front edge of the outer rotatable ring 512, cover 514, and lens 510 are shaped such that they together form an integrated convex rounded front face that has a common outward arc or spherical shape arcing outward.

Although being formed from a single lens-like piece of material such as polycarbonate, the cover 514 has two different regions or portions including an outer portion 514o and a central portion 514i. According to some embodiments, the cover 514 is darkened around the outer portion 514o, but leaves the central portion 514i visibly clear so as to facilitate viewing of an electronic display 516 disposed underneath. According to some embodiments, the cover 514 acts as a lens that tends to magnify the information being displayed in electronic display 516 to users. According to some embodiments the central electronic display 516 is a dot-matrix layout (i.e. individually addressable) such that arbitrary shapes can be generated. According to some embodiments, electronic display 516 is a backlit, color liquid crystal display (LCD). An example of information displayed on the electronic display 516 is illustrated in FIG. 5A, and includes central numerals 520 that are representative of a current setpoint temperature. The thermostat 102 may be constructed such that the electronic display 516 is at a fixed orientation and does not rotate with the outer rotatable ring 512. For some embodiments, the cover 514 and lens 510 also remain at a fixed orientation and do not rotate with the outer ring 512. In alternative embodiments, the cover 514 and/or the lens 510 can rotate with the outer rotatable ring 512. According to one embodiment in which the diameter of the thermostat 102 is about 84 mm, the diameter of the electronic display 516 is about 54 mm. According to some embodiments the curved shape of the front surface of thermostat 102, which is made up of the cover 514, the lens 510 and the front facing portion of the ring 512, is spherical, and matches a sphere having a radius of between 100 mm and 180 mm. According to some embodiments, the radius of the spherical shape of the thermostat front is about 156 mm.

Motion sensing with PIR sensor 550 as well as other techniques can be used in the detection and/or prediction of occupancy. According to some embodiments, occupancy information is used in generating an effective and efficient scheduled program. A second near-field proximity sensor 552 is also provided to detect an approaching user. The near-field proximity sensor 552 can be used to detect proximity in the range of up to 10-15 feet. the PIR sensor 550 and/or the near-field proximity sensor 552 can detect user presence such that the thermostat 102 can initiate "waking up" and/or providing adaptive screen displays that are based on user motion/position when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, the thermostat 102 may be controlled by at least two types of user input, the first being a rotation of the outer rotatable ring 512 as shown in FIG. 5A, and the second being an inward push on head unit 540 until an audible and/or tactile "click" occurs. For such embodiments, the head unit 540 is an assembly that includes the outer ring 512, the cover 514, the electronic display 516, and the lens 510. When pressed inwardly by the user, the head unit 540 travels inwardly by a small amount, such as 0.5 mm, against an interior switch (not shown), and then springably travels back out when the inward pressure is released, providing a tactile "click" along with a corresponding audible clicking sound. Thus, for the embodiment of FIGS. 5A-5B, an inward click can be achieved by direct pressing on the outer rotatable ring 512 itself, or by indirect pressing of the outer rotatable ring 512 by virtue of providing inward pressure on the cover 514, the lens 510, or by various combinations thereof. For other embodiments, the thermostat 102 can be mechanically configured such that only the outer ring 512 travels inwardly for the inward click input, while the cover 514 and lens 510 remain motionless.

FIG. 5B illustrates a right side elevation view of the thermostat 102. According to some embodiments, the thermostat 102 includes a processing system 560, display driver 564 and a wireless communications system 566. The processing system 560 is adapted to cause the display driver 564 and display 516 to display information to the user, and to receive user input via the outer rotatable ring 512. The processing system 560, according to some embodiments, is capable of carrying out the governance of the operation of thermostat 102 including various user interface features. The processing system 560 is further programmed and configured to carry out other operations, such as maintaining and updating a thermodynamic model for the enclosure in which the HVAC system is installed. According to some embodiments, a wireless communications system 566 is used to communicate with devices such as personal computers, other thermostats or HVAC system components, smart phones, local home wireless networks, routers, gateways, home appliances, security systems, hazard detectors, remote thermostat management servers, distributed sensors and/or sensor systems, and other components it the modern smart-home environment. Such communications may include peer-to-peer communications, communications through one or more servers located on a private network, or and/or communications through a cloud-based service.

According to some embodiments, the thermostat 102 includes a head unit 540 and a backplate (or wall dock) 542. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs, and/or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit (s) or from a common wire, if available. According to some embodiments, the rechargeable battery 522 may include a single cell lithium-ion battery, or a lithium-polymer battery.

FIGS. 6A-6D illustrate exploded front and rear perspective views, respectively, of the thermostat 102 with respect to its two main components, which are the head unit 540 and the backplate 542. In the drawings shown herein, the "z" direction is outward from the wall, the "y" direction is the toe-to-head direction relative to a walk-up user, and the "x" direction is the user's left-to-right direction.

Figure 6A:
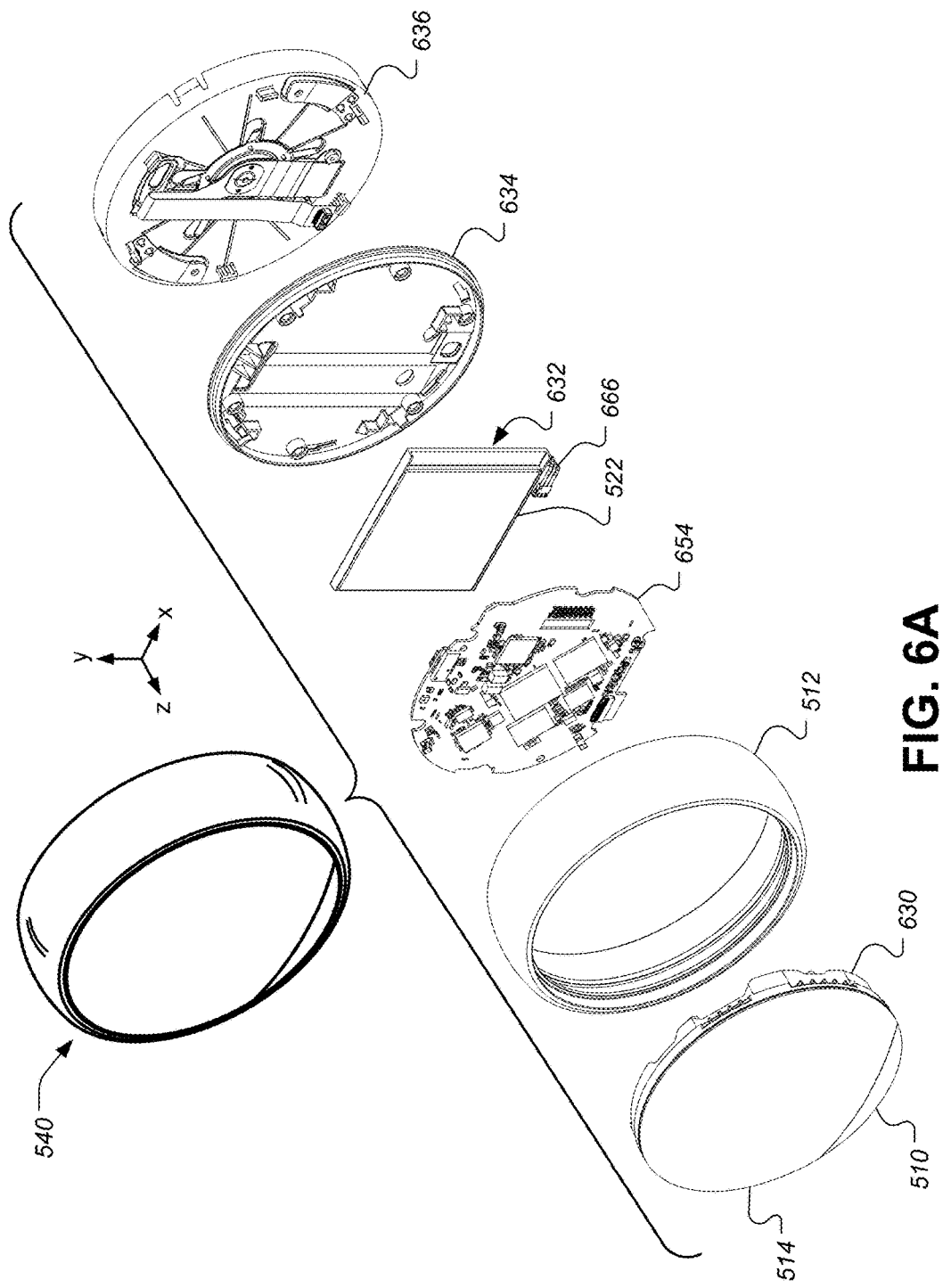
FIG. 6A illustrates an exploded front perspective view of a head unit with respect to its primary components, according to some embodiments.

FIG. 6A illustrates an exploded front perspective view of the head unit 540 with respect to its primary components. Head unit 540 includes, a back cover 636, a bottom frame 634, a battery assembly 632 with the rechargeable battery 522, a head unit printed circuit board (PCB) 654, the outer rotatable ring 512, the cover 514, and the lens 510. Behind the lens is the display assembly 630, which will be described in relation to FIG. 6B below. Electrical components on the head unit PCB 654 can connect to electrical components on the back plate 542 by virtue of a plug-type electrical connector on the back cover 636. The head unit PCB 654 is secured to head unit back cover 636 and display assembly 630. The outer rotatable ring 512 is held between a bearing surface on the display assembly 630 and bearing surfaces on the bottom frame 634. Motion of the outer rotatable ring 512 in the z direction is constrained by flat bearing surfaces on the display assembly 630 and bottom frame 634, while motion of the ring in x and y directions are constrained at least in part by circular rounded surfaces on the bottom frame 634. According to some embodiments, the bearing surfaces of the bottom frame 634 and/or the display assembly 630 are greased and/or otherwise lubricated to both smooth and dampen rotational movement for the outer ring 512. The head unit printed PCB 654 may include some or all of processing system 560, display driver 564, wireless communication system 566, and battery recharging circuitry 524 as shown and described with respect to FIG. 5A, as well as one or more additional memory storage components. According to some embodiments, circuitry and components are mounted on both sides of head unit PCB 654. Although not shown, according to some embodiments, shielding can surround circuitry and components on both sides of the head unit PCB 654.

Battery assembly 632 includes a rechargeable battery 522. Battery assembly 632 also includes connecting wires 666, and a battery mounting film that is attached to battery 522 using a strong adhesive and/or the any rear shielding of head unit PCB 654 using a relatively weaker adhesive. According to some embodiments, the battery assembly 632 is user-replaceable.

Figure 6B:
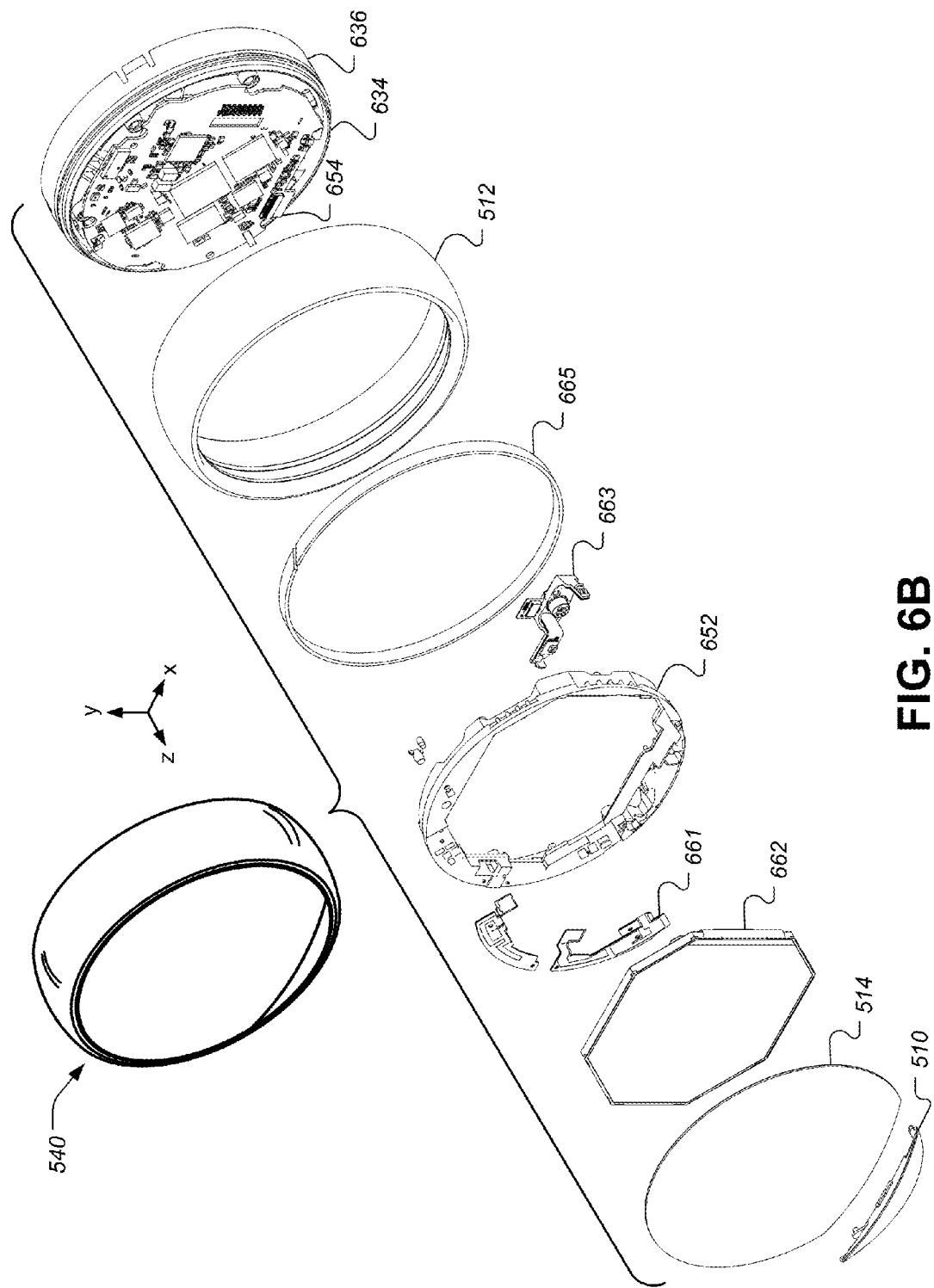
FIG. 6B illustrates an exploded front perspective view of a head unit display assembly with respect to its primary components, according to some embodiments.

FIG. 6B illustrates an exploded front perspective view of the head unit 540 with an exploded view of the display assembly 630. The display assembly 630 comprises the cover 514, the lens 510, an LCD module 662, a pair of RF antennas 661, a head unit top frame 652, a sensor flex assembly 663, and a magnetic ring 665. The sensor flex assembly 663 connects to the head unit PCB 654 using a connector on a flexible PCB. The sensor flex assembly 663 also includes the PIR sensor 550 and the near-field proximity sensor 552. Additionally, the sensor flex assembly 663 may include a temperature sensor IC that is positioned close to the lens 515 so as to accurately measure temperature outside of the thermostat 102 without being overly affected by internal heating of thermostat components. The sensor flex assembly 663 may be comprised of these three sensors, along with a flexible PCB (including the connector for the head unit PCB 654) and a plastic bracket to which the sensors and flexible PCB are mounted. The bracket ensures that the sensor flex assembly 663 is positioned and oriented consistently and correctly with respect to the lens 510. The lens 510 includes two sections that are thinned to approximately 0.3 mm in front of the near-field proximity sensor 552 and the temperature sensor. The lens 510 also includes a section with a Fresnel lens pattern in front of the PIR sensor 550. In some embodiments, additional temperature sensors may be placed throughout the thermostat 102, such as a temperature sensor on the head unit PCB 654 and a temperature sensor on the back plate PCB 680.

The head unit PCB 554 includes a Hall effect sensor that senses rotation of the magnetic ring 665. The magnetic ring 665 is mounted to the inside of the outer rotatable ring 512 using an adhesive such that the outer rotatable ring 512 and the magnetic ring 665 are rotated together. The magnetic ring 665 includes striated sections of alternating magnetic polarity that are diagonally positioned around the magnetic ring 665. The Hall effect sensor senses the alternations between magnetic polarities as the outer ring 512 is rotated. The Hall effect sensor can be controlled by a primary processor, which is a higher powered processor, without excessive power drain implications because the primary processor will invariably be awake already when the user is manually turning the outer rotatable ring 512 to control the user interface. Advantageously, very fast response times can also be provided by the primary processor.

The antennas 661 are mounted to the top surface of the head unit top frame 652. The wireless communications system 566 may include Wi-Fi radios of various frequencies (e.g., 2.4 GHz and 5.0 GHz), along with an IEEE 802.15.4-compliant radio unit for a local-area smart home device network that may include other thermostats, hazard detectors, security system modules, and so forth. The IEEE 802.15.4 unit may use the Thread protocol for achieving such communications. In some embodiments, the wireless communications system 566 may also include a Bluetooth low energy (BLE) radio for communication with user devices.

The processing system 560 may be primarily located on the head unit PCB 654 and may include a primary processor and a secondary processor. The primary processor may be a comparatively high-powered processor, such as the AM3703 chip, or the MCIMX6X3EVK10AB chip from Freescale™, and may be programmed to perform sophisticated thermostat operations, such as time-to-temperature calculations, occupancy determination algorithms, ambient temperature compensation calculations, software updates, wireless transmissions, operation of the display driver 564, and regulation of the recharging circuitry 524. The secondary processor, such as the STM32L chip from ST microelectronics, may be a comparatively low-power processor when compared to the primary processor. The secondary processor may interact with the HVAC system to control a series of FET switches that control the functioning of the HVAC system. The secondary processor may also interface with various sensors in thermostat 102, such as the temperature sensors, a humidity sensor, an ambient light sensor, and/or the like. The secondary processor may also share duties with the primary processor in regulating the recharging circuitry 522 to provide power to all of the electrical systems on board the thermostat 102. Generally, the primary processor will operate in a "sleep" mode until high-power processing operations (e.g., wireless communications, user interface interactions, time-to-temperature calculations, thermal model calculations, etc.) are required, while the secondary processor will operate in an "awake" mode more often than the primary processor in order to monitor environmental sensors and wake the primary processor when needed.

Figures 6C, 6D:
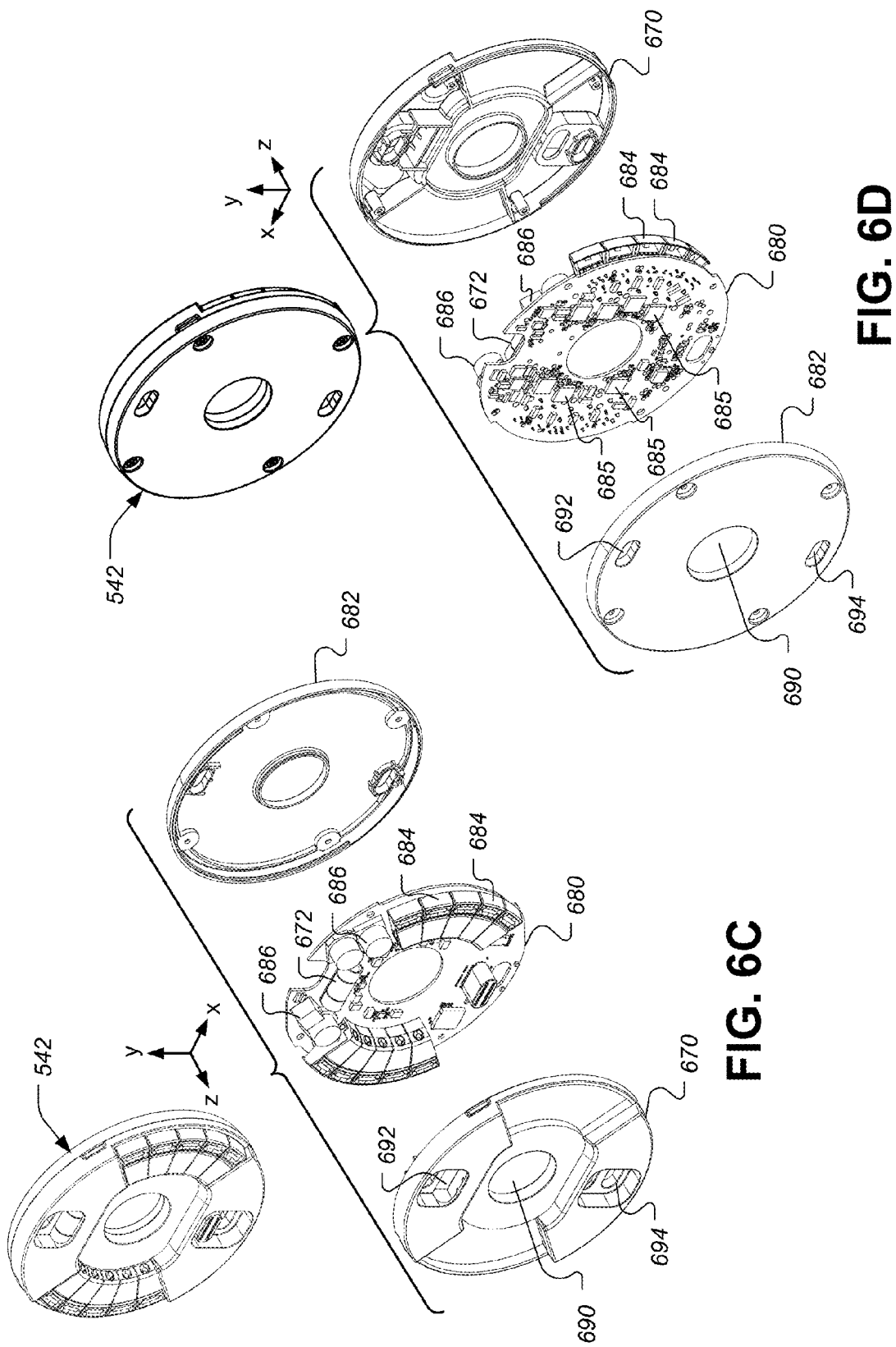
FIGS. 6C-6D illustrate exploded front and rear perspective views, respectively, of a back plate unit with respect to its primary components, according to some embodiments.

FIGS. 6C-6D illustrate exploded front and rear perspective views, respectively, of the back plate unit 542 with respect to its primary components, according to some embodiments. Back plate unit 542 comprises a back plate rear plate 682, a back plate PCB 680, and a back plate cover 670. Visible in FIG. 6C are the HVAC wire connectors 684 that include integrated mechanical wire insertion sensing circuitry, and relatively large capacitors 686 that are used by part of the power stealing circuitry that is mounted on the back plate PCB 680. According to some embodiments, backplate 542 includes electronics and a temperature/humidity sensor in housing. Wire connectors 684 are provided to allow for connection to HVAC system wires, which pass though the large central circular opening 690, which is visible in each of the backplate primary components. Also visible in each of the backplate primary components are two mounting holes 692 and 694 for use in fixing the backplate to the wall. Also visible in FIGS. 6C-6D are a bubble level 672 to allow the user to install the thermostat 102 in a level position without additional tools.

The back plate PCB 680 also may include approximately seven custom power isolation ICs 685 that isolate the internal electronics of the thermostat 102 from the relatively high 24 VAC signals of the HVAC system. The power isolation ICs 685 are custom software-resettable fuses that both monitor transient and anomalous voltage/current signals on the HVAC power/return wires and switch off the connection to isolate the thermostat against any dangerous signals that could damage the internal electronics. The power isolation ICs 685 receive command signals encoded in a clock square wave from the processing system 560 to open and close a pair of power FETs for each HVAC return wire in order to activate the corresponding HVAC function (e.g., fan, air-conditioning, heat, heat pump, etc.).

Figure 7:
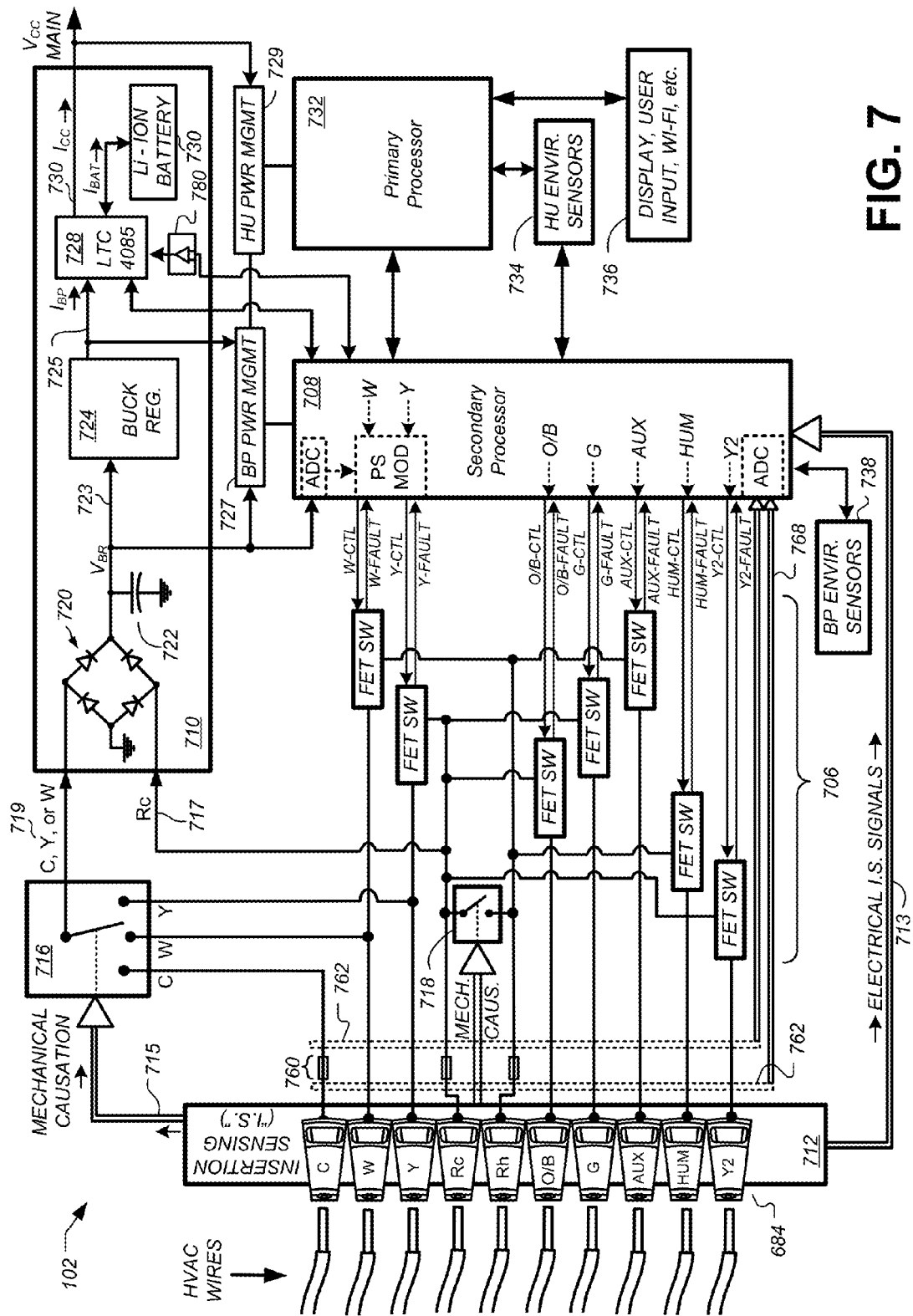
FIG. 7 illustrates a block diagram illustrating circuitry within a thermostat, according to some embodiments.

FIG. 7 illustrates a power management and power harvesting system for a smart thermostat, according to some embodiments. FIG. 7 shows connections to common HVAC wiring, such as a W (heat call relay wire); Y (cooling call relay wire); Y2 (second stage cooling call relay wire); Rh (heat call relay power); Rc (cooling call relay power); G (fan call relay wire); O/B (heat pump call relay wire); AUX (auxiliary call relay wire); HUM (humidifier call relay wire); and C (common wire). As discussed above, the thermostat 102 comprises a plurality of FET switches 706 (such as the power isolation ICs 685 of FIG. 6D above) used for carrying out the essential thermostat operations of connecting or "shorting" one or more selected pairs of HVAC wires together according to the desired HVAC operation. The operation of each of the FET switches 706 is controlled by the secondary processor 708 which can comprise, for example, an STM32L 32-bit ultra-low power ARM-based microprocessor available from ST Microelectronics.

Thermostat 102 further comprises powering circuitry 710 that comprises components contained on both the backplate 542 and head unit 540. Generally speaking, it is the purpose of powering circuitry 710 to extract electrical operating power from the HVAC wires and convert that power into a usable form for the many electrically-driven components of the thermostat 102. Thermostat 102 further comprises insertion sensing components 712 configured to provide automated mechanical and electrical sensing regarding the HVAC wires that are inserted into the thermostat 102. Thermostat 102 further comprises a relatively high-power primary processor 732, such as an AM3703 Sitara ARM available from Texas Instruments, that provides the main general governance of the operation of the thermostat 102. Thermostat 102 further comprises environmental sensors 734/738 (e.g., temperature sensors, humidity sensors, active IR motion sensors, passive IR motion sensors, multi-channel thermopiles, ambient visible light sensors, accelerometers, ambient sound sensors, ultrasonic/infrasonic sound sensors, microwave sensors, GPS sensors, etc.), as well as other components 736 (e.g., electronic display devices and circuitry, user interface devices and circuitry, wired communications circuitry, wireless communications circuitry, etc.) that are operatively coupled to the primary processor 732 and/or secondary processor 708 and collectively configured to provide the functionalities described in the instant disclosure.

The insertion sensing components 712 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. With respect to the HVAC wiring connectors 684 that are dedicated to the C, W, Y, Rc, and Rh terminals, those dedicated electrical switches are, in turn, networked together in a manner that yields the results that are illustrated in FIG. 7 by the blocks 716 and 718. The output of block 716, which is provided at a node 719, is dictated solely by virtue of the particular combination of C, W, and Y connectors into which wires have been mechanically inserted in accordance with the following rules: if a wire is inserted into the C connector, then the node 719 becomes the C node regardless of whether there are any wires inserted into the Y or W connectors; if no wire is inserted into the C connector and a wire is inserted into the Y connector, then the node 719 becomes the Y node regardless of whether there is a wire inserted into the W connector; and if no wire is inserted into either of the C or Y connectors, then the node 719 becomes the W node. Block 718 is shown as being coupled to the internal sensing components 712 by virtue of double lines termed "mechanical causation," for the purpose of denoting that its operation, which is either to short the Rc and Rh nodes together or not to short the Rc and Rh nodes together. Whether the block 718 will short, or not short, the Rc and Rh nodes together is dictated solely by virtue of the particular combination of Rc and Rh connectors into which wires have been mechanically inserted. Block 718 will keep the Rc and Rh nodes shorted together, unless wires have been inserted into both the Rc and Rh connectors, in which case the block 718 will not short the Rc and Rh nodes together because a two-HVAC-transformer system is present. The insertion sensing circuitry 712 is also configured to provide at least two signals to the secondary processor 708, the first being a simple "open" or "short" signal that corresponds to the mechanical insertion of a wire, and the second being a voltage or other level signal that represents a sensed electrical signal at that terminal. The first and second electrical signals for each of the respective wiring terminals can advantageously be used as a basis for basic "sanity checking" to help detect and avoid erroneous wiring conditions.

Basic operation of each of the FET switches 706 is achieved by virtue of a respective control signal (e.g., W-CTL, Y-CTL) provided by the secondary processor 708 that causes the corresponding FET switch 706 to "connect" or "short" its respective HVAC lead inputs for an ON control signal, and that causes the corresponding FET switch 706 to "disconnect" or "leave open" or "open up" its respective HVAC lead inputs for an "OFF" control signal. By virtue of the above-described operation of block 718, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation.

Referring now to the powering circuitry 710 in FIG. 7, provided is a configuration that automatically adapts to the powering situation presented to the thermostat 102 at the time of installation and thereafter. The powering circuitry 710 comprises a full-wave bridge rectifier 720, a storage and waveform-smoothing bridge output capacitor 722 (which can be, for example, on the order of 30 microfarads), a buck regulator circuit system 724, a power-and-battery (PAB) regulation circuit 728, and a rechargeable lithium-ion battery 730. In conjunction with other control circuitry including backplate power management circuitry 727, head unit power management circuitry 729, and the secondary processor 708, the powering circuitry 710 is configured and adapted to have the characteristics and functionality described hereinbelow.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. As illustrated in FIG. 7, the powering circuitry 710 generally serves to provide the voltage Vcc MAIN that is used by the various electrical components of the thermostat 102, and that in one embodiment will usually be about 3.7V-3.95V. The general purpose of powering circuitry 710 is to convert the 24 VAC presented between the input leads 719 and 717 to a steady DC voltage output at the Vcc MAIN node to supply the thermostat electrical power load.

Operation of the powering circuitry 710 for the case in which the "C" wire is present is now described. When the 24 VAC input voltage between nodes 719 and 717 is rectified by the full-wave bridge rectifier 720, a DC voltage at node 723 is present across the bridge output capacitor 722, and this DC voltage is converted by the buck regulator system 724 to a relatively steady voltage, such as 4.4 volts, at node 725, which provides an input current $I_{BP}$ to the power-and-battery (PAB) regulation circuit 728.

The secondary processor 708 controls the operation of the powering circuitry 710 at least by virtue of control leads leading between the secondary processor 708 and the PAB regulation circuit 728, which for one embodiment can include an LTC4085-4 chip available from Linear Technologies Corporation. The LTC4085-4 is a USB power manager and Li-Ion/Polymer battery charger originally designed for portable battery-powered applications. The PAB regulation circuit 728 provides the ability for the secondary processor 708 to specify a maximum value $I_{BP}$(max) for the input current $I_{BP}$. The PAB regulation circuit 728 is configured to keep the input current at or below $I_{BP}$(max), while also providing a steady output voltage Vcc, such as 4.0 volts, while also providing an output current Icc that is sufficient to satisfy the thermostat electrical power load, while also tending to the charging of the rechargeable battery 730 as needed when excess power is available, and while also tending to the proper discharging of the rechargeable battery 730 as needed when additional power (beyond what can be provided at the maximum input current $I_{BP}$(max)) is needed to satisfy the thermostat electrical power load.

Operation of the powering circuitry 710 for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 719 and the Rc lead that appears at node 717. There will be a 24 VAC HVAC transformer voltage present across nodes 719/717 when no cooling call is in place (i.e., when the Y-Rc FET switch is open). For one embodiment, the maximum current $I_{BP}$(max) is set to a relatively modest value, such as 20 mA, for the case of inactive power stealing. Assuming a voltage of about 4.4 volts at node 725, this corresponds to a maximum output power from the buck regulator system 724 of about 88 mW. This power level of 88 mW has been found to not accidentally trip the HVAC system into an "on" state due to the current following through the call relay coil. During this time period, the PAB regulator 728 operates to discharge the battery 730 during any periods of operation in which the instantaneous thermostat electrical power load rises above 88 mW, and to recharge the battery (if needed) when the instantaneous thermostat electrical power load drops below 88 mW. The thermostat 700 is configured such that the average power consumption is well below 88 mW, and indeed for some embodiments is even below 10 mW on a long-term time average.

Operation of the powering circuitry 710 for "active power stealing" is now described. During an active heating/cooling call, it is necessary for current to be flowing through the HVAC call relay coil sufficient to maintain the HVAC call relay in a "tripped" or ON state at all times during the active heating/cooling call. The secondary processor 708 is configured by virtue of circuitry denoted "PS MOD" to turn, for example, the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 720 to keep the bridge output capacitor 722 to a reasonably acceptable operating level. For one embodiment, this is achieved in a closed-loop fashion in which the secondary processor 708 monitors the voltage $V_{BR}$ at node 723 and actuates the signal Y-CTL as necessary to keep the bridge output capacitor 722 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 102. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

Peak Demand "Charge Guard" Architecture

Embodiments discussed herein generally relate to techniques for enrolling customers in peak demand charge rate plan, providing an intelligent thermostat that is capable of dynamically adjusting a learned setpoint schedule to accommodate instantaneous peak demand notifications, providing an Application Programming Interface (API) at a thermostat management server for receiving peak demand plan information and enrollment information from an energy provider, and transmitting such information to the intelligent thermostat. The entities in a system for managing demand programs and events may include a utility provider that provides electrical or other forms of energy from a power source (e.g., an electrical generator) to individual homes or businesses. In some embodiments a thermostat management server is disposed between a utility provider computer system and a plurality of structures. The thermostat management server operates to intelligently and effectively control individual thermostats in the structures to modify HVAC energy consumption during when a peak demand event is detected. Such modification is usually performed so as to minimize HVAC usage to either avoid crossing a peak demand threshold in instantaneous total energy usage, or if crossing the peak demand threshold cannot be avoided, at least minimizing the amount of energy used above the threshold.

The thermostat management server according to many embodiments interfaces with an intelligent, network-connected thermostat installed in each structure, such as the thermostat described above in relation to FIGS. 5-7. Such a thermostat can acquire information about the residence, a likelihood of the residence being occupied (via occupancy sensors that, over time, can build an occupancy probability profile), a weather forecast, a real-time weather status, a real-time occupancy, etc. Moreover, the thermostat can be programmed by its users or may learn, over time, the preferences and habits of its users to set scheduled setpoints that include a target temperature and a time. In some embodiments, a population of such network-connected thermostats associated with a respective population of individual structures may be configured to communicate with the thermostat management server. Each network-connected thermostat may be associated with one or more accounts managed by the thermostat management server, and data may be sent back and forth as needed between each network-connected thermostat and the thermostat management server for providing a variety of advantageous functionalities, such as facilitating remote control, reporting weather data, reporting HVAC control data and status information, and/or providing the centralized and/or partially centralized control and data communications required to carry out DR-related, ToU-related, and/or real-time peak demand rate functionalities described herein.

It is to be appreciated that some embodiments herein may be particularly suitable and advantageous for commercial scenarios in which the thermostat management server associated with the population of network-connected thermostats is a separate and distinct business entity from the utilities providers themselves.

Figure 8:
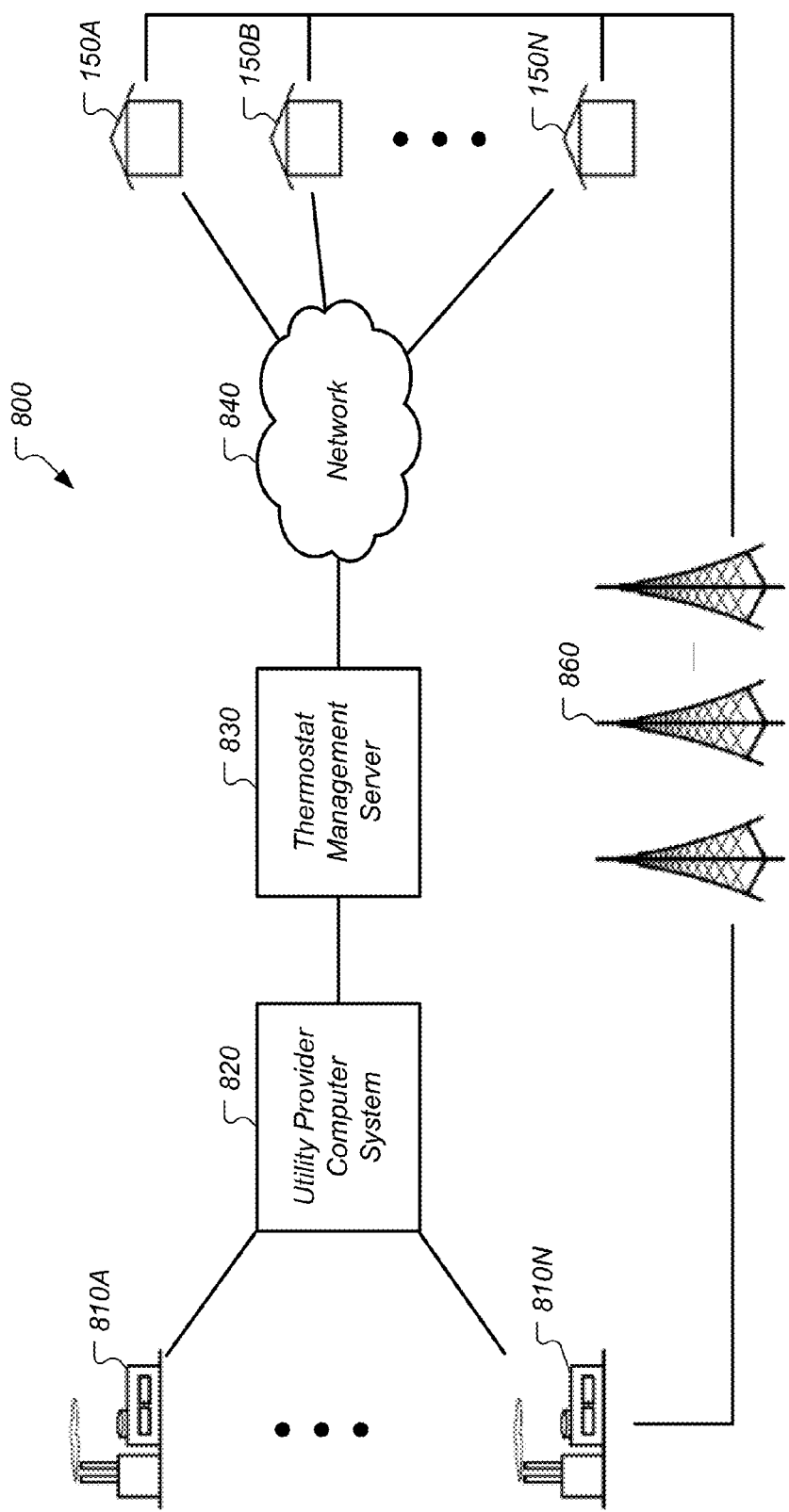
FIG. 8 depicts a system for managing peak demand programs and events according to some embodiments.

FIG. 8 depicts a system 800 for managing peak demand programs and events according to some embodiments. System 800 includes a plurality of electrical power generators 810A-810N, a utility provider computing system 820, a thermostat management server 830, a communication network 840, a plurality of energy consumer structures 150A-150N, and a power distribution network 860.

Electrical power generators 810 are operable to generate electricity or other type of energy (e.g., natural gas) using one or more of a variety of techniques known in the art. For example, electrical power generators 810 may include hydroelectric systems, nuclear power plants, fossil-fuel based power plants, solar plants, wind plants, gas processing plants, etc. The amount of electricity that may be generated at any given time may be limited to some maximum energy supplied that is determined by the generators 810. Further, the electrical power generators 810 may be owned and managed by a utility provider implementing the utility provider computing system 820, or may be owned and/or managed by one or more third party entities that contract with the utility provider to provide source energy to customers of the utility provider.

Utility provider computer system 820 may include a computing system operable to communicate with one or more of the electrical power generators 810A-810N and the thermostat management server 830. The utility provider associated with the utility provider computer system 820 typically manages the distribution of electricity from the electrical power generators 810A-810N to energy consumers at the structures 150A-150N. This management includes ensuring the electricity is successfully communicated from the power generators 810A-810N to the structures 150A-150N, monitoring the amount of energy consumption at each of the structures 150A-150N, and collecting fees from occupants of the structures 150A-150N in accordance with the their respective monitored amount of energy consumption. The utility provider computer system 820 may perform one or more of the operations described herein, and may include a variety of computer processors, storage elements, communication mechanisms, etc. as further described herein and as necessary to facilitate the described operations.

Thermostat management server 830 may include a computing system operable to intelligently and efficiently manage the HVAC energy consumption at one or more of the structures 150A-150N while optionally providing reporting and control mechanisms to the utility provider computing system 820. The thermostat management server 830 may be operable to engage in real-time two-way communications with thermostat devices associated with the structures 150A-150N via the network 840, as well as engage in real-time two-way communications with the utility provider computer system 820. The thermostat management server 830 may perform one or more of the operations described herein, and may include a variety of computer processors, storage elements, communication mechanisms, etc. as further described herein and as necessary to facilitate the described operations. Specifically, the thermostat management server 830 may include a plurality of servers, databases, and/or cloud platform/services, distributed across various locations.

Network 840 may include any suitable network for enabling communications between various entities, such as between one or more components of the thermostat management server 830 and one or more electronic devices associated with one or more of the structures 150A-150N. Such a network may include, for example, a local area network, a wide-area network, a virtual private network, the Internet, an intranet, an extranet, a public switched telephone network, an infrared network, a wireless network, a wireless data network, a cellular network, or any other such wired or wireless network(s) or combination(s) thereof. The network 840 may, furthermore, incorporate any suitable network topology. Network 840 may utilize any suitable protocol, and communication over the network 840 may be enabled by wired or wireless connections, and any combinations thereof.

Structures 150A-150N may include a variety of structures or enclosures that are associated with HVAC energy consumption. The structures may span a variety of structural types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in a residential living context, it is to be appreciated that this is for purposes of clarity of description and not by way of limitation.

The structures 150A-150N typically include one or more energy consumption devices, which could be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, the structures 150A-150N may include a natural gas (air/water/etc.) heater, stove, fireplace, etc. The structures 150A-150N in many embodiments include an intelligent, network connected thermostat that is operable to control the thermal environment of the residence. For some embodiments, some or all of the intelligent, network-connected thermostats may be the same as or similar in functionality to the NEST LEARNING THERMOSTAT® available from Google, Inc. of Palo Alto, Calif.

Power distribution network 860 may include any suitable network for transferring energy from one or more of the electrical power generators 810A-810N to one or more of the structures 150A-150N. In an electrical distribution network, power distribution network 860 may include a variety of power lines, substations, pole-mounted transformers, and the like as known in the art for carrying electricity from the electrical power generators 810A-810N to the structures 150A-150N. In a gas distribution network, power distribution network 860 may include a variety of compressor stations, storage elements, pipes, and/or the like for transporting natural or other types of energy producing gas from the power generators 810A-810N (in this embodiment, gas wells and/or processing plants) to the structures 150A-150N.

System 800 in certain embodiments may be a distributed system utilizing several computer systems and components that are interconnected via communication links using one or more computer networks or direct connections. However, it will be appreciated by those skilled in the art that such a system could operate equally well in a system having fewer or a greater number of components than are illustrated in FIG. 8. Thus, the depiction of system 800 in FIG. 8 should be taken as being illustrative in nature, and not as limiting the scope of the present embodiments.

Energy providers face variable rates for energy during different yearly seasons and even throughout the hours of a single day. Energy rates for utility providers to purchase energy from the electrical power generators 810A-810N are often low in the morning and late at night, and then climb during peak-power usage hours in the late afternoon as customers run their air conditioners more extensively. However, many rate plans offered by energy providers to customers use a standard energy rate that does not track with the varying energy rate borne by the energy providers to generate and deliver energy to customers. In order to more accurately pass the costs of energy onto customers, energy providers are beginning to offer alternative pricing plans that allow utility providers to recoup more of the cost of energy from customers during peak-power usage hours.

Figure 9:
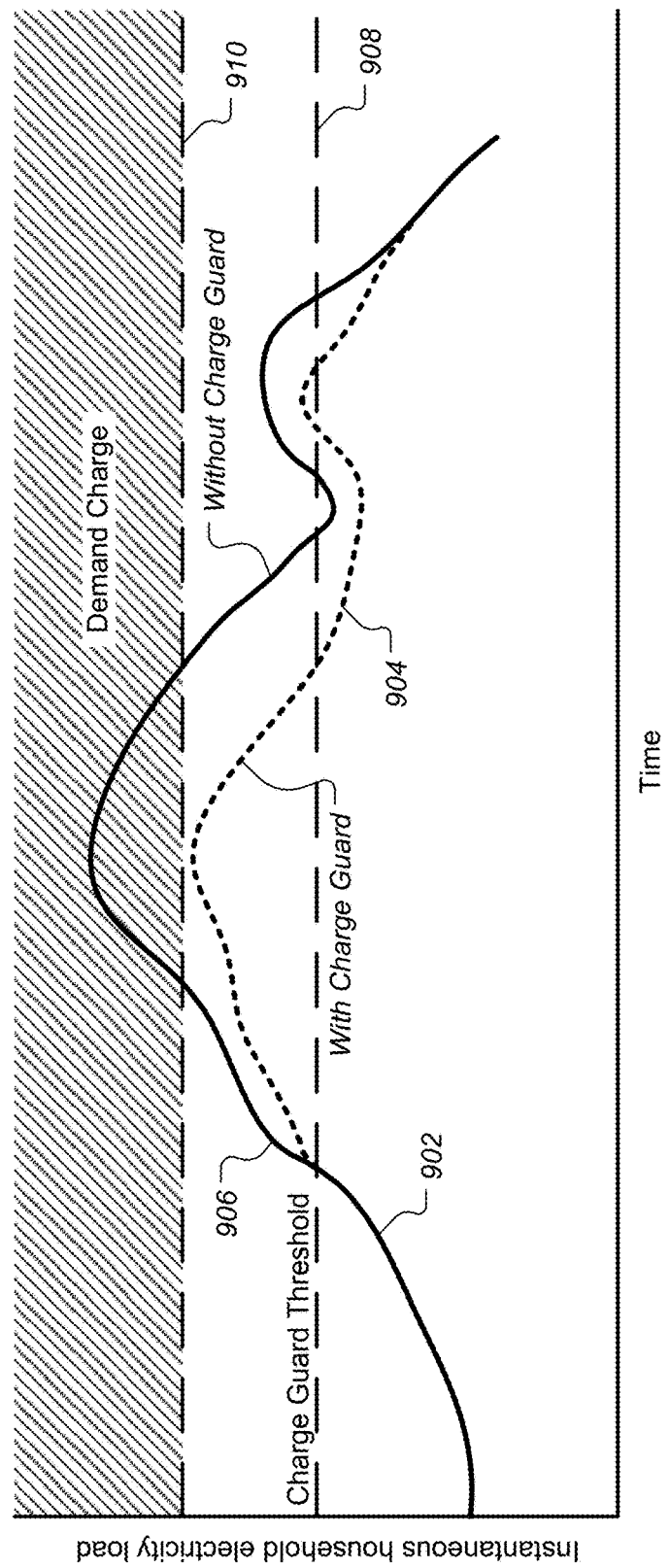
FIG. 9 illustrates a peak demand rate model, according to some embodiments.

FIG. 9 illustrates a peak demand rate model, according to some embodiments. In a given time interval, customers are charged a single constant energy rate for energy usage. The time interval may be continuous, such that customers are always charged the same amount for energy. In other cases, a time interval may be a fraction of the day. This allows the utility provider to charge different rates during different hours. Such a time-based rate plan is referred to herein as a time-of-use (ToU) rate plan.

Regardless of the type of plan selected by the customer, within a particular time interval the customer often assumes that they pay a single rate for energy usage, regardless of the amount of energy used. However, the total instantaneous power usage of a structure is also of interest to utility providers. During peak demand hours of the day, such as the mid-to-late afternoon, exist because that is a time when most users operate their high-power appliances and devices, whether intentionally or as the result of automated schedules for systems. The mid-to-late afternoon is typically the hottest time of the day, which results in user's activating their air conditioners. Refrigerators also run the compressor more often when the interior temperature of the structure is hotter. The late afternoon is also when children arrive home from school and use household electronics. Time intervals such as these are referred to herein as "peak demand intervals."

One method of reducing the total energy demand on a power grid during the peak demand intervals is to enroll users in a "demand response" program that allows customers to voluntarily receive payments in exchange for energy reductions made during the peak demand intervals. However, offering monetary savings is often not sufficient to convince a large number of users to participate in demand response programs. FIG. 9 illustrates an alternative charge incentive that encourages customers to reduce their overall demand during peak demand intervals. Using a method that is referred to herein as a "demand charge" or "demand charge event" utility providers can institute a tiered rate plan for instantaneous usage. For example, a threshold 910 for instantaneous power usage can be predetermined and when the instantaneous household energy usage 906 of the customer exceeds the threshold 910, additional charges may be added to a customer's utility bill. These charges may be one-time charges, or may be based on both the amount by which the instantaneous household energy usage 906 exceeds the threshold 910 and/or the duration that the instantaneous household energy usage 906 exceeds the threshold 910.

The embodiments described herein provide an architecture for helping customers avoid peak demand charges. In the past, there was no way to automate energy reduction based on instantaneous household usage compared to a utility provider mandated threshold. In these embodiments, the utility provider uses a meter (e.g., an inverter) to monitor the instantaneous household energy usage 906 for the house. The utility provider can detect at a central utility provider computer system when the instantaneous household energy usage 906 is on a trajectory that would indicate that the threshold 910 will be surpassed.

In some embodiments, the utility provider computer system can monitor the rate of change of the instantaneous household energy usage 906, and use the slope to extrapolate a predicted future instantaneous energy usage curve for the structure. As soon as this projected model is shown to exceed the threshold 910, the utility provider can transmit a demand charge event to the thermostat management server. In some embodiments, the utility provider computer system can institute a second threshold 908 that is below the threshold 910. As soon as the instantaneous household energy uses 906 crosses the second threshold 908, the utility provider computer system can transmit the demand charge event. In some embodiments, the utility provider computer system can wait until the instantaneous household energy usage 906 actually crosses the threshold 910 before declaring a demand charge event.

As will be described in greater detail below, after receiving the demand charge event, the thermostat management server can communicate with the thermostat to modify the existing setpoint schedule to reduce household energy usage. As used herein, the term "charge guard" refers to this function of the thermostat that modifies the setpoint schedule to reduce HVAC energy usage in order to avoid a peak demand charge. FIG. 9 illustrates how the instantaneous household energy usage 906 is modified using the charge guard feature. An alternate instantaneous household energy usage 904 occurs after the utility provider computer system predicts that a demand charge event is likely. Note that the alternate instantaneous household energy usage 904 avoids the demand charge threshold 910. Also note that the general curvature of the alternate instantaneous household energy uses 904 is very similar to that of the instantaneous household energy usage 906 without the charge guard feature. This is primarily because the HVAC energy usage is only a portion of the total instantaneous household energy usage 906. However, removing as much of the HVAC energy usage from the total instantaneous household energy usage 906 has been shown in experimental trials to often be sufficient to lower the total instantaneous household energy usage 906 below the threshold 904.

Figure 10:
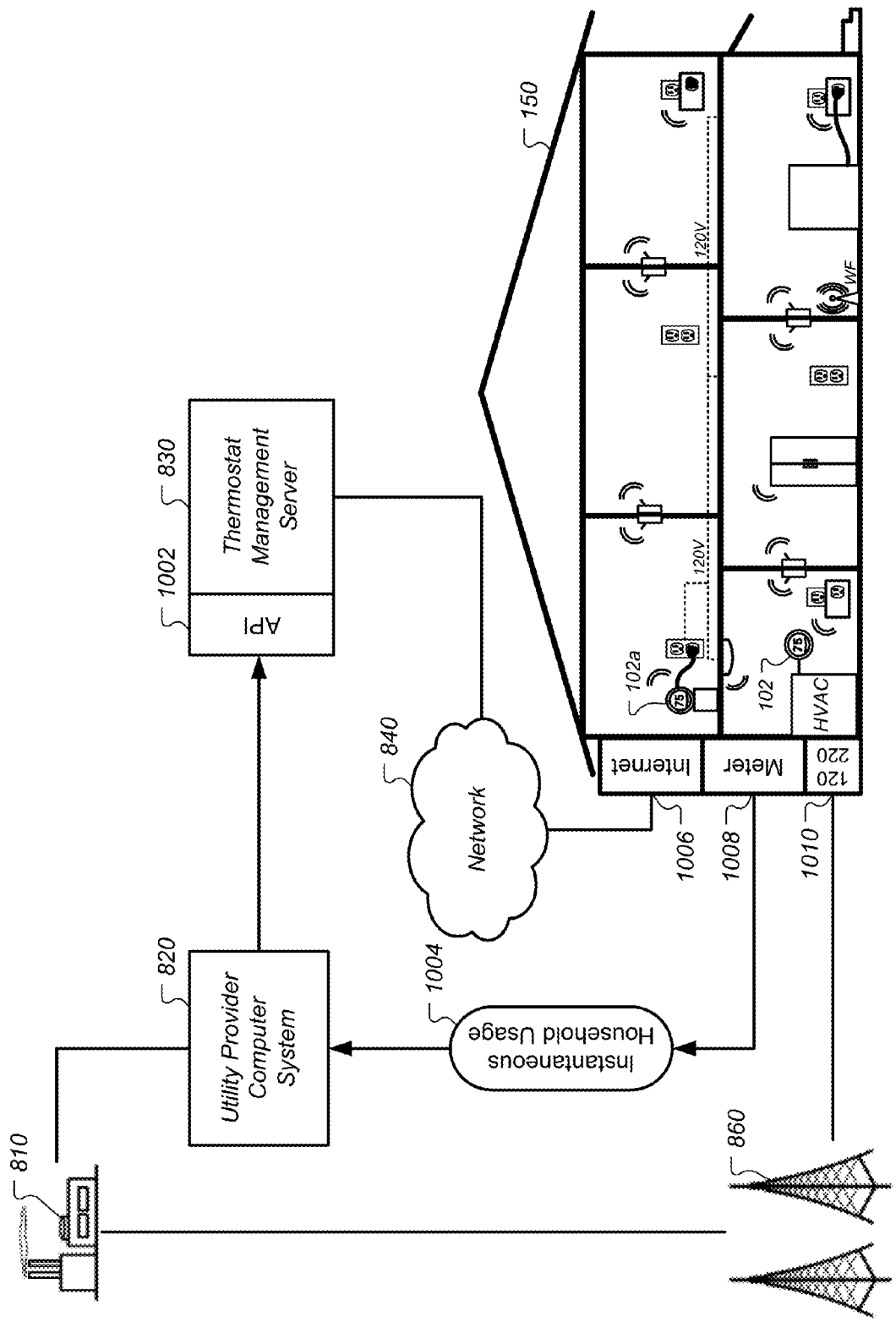
FIG. 10 illustrates an alternate arrangement of systems for implementing a charge guard feature, according to some embodiments.

FIG. 10 illustrates an alternate arrangement of systems for implementing a charge guard feature, according to some embodiments. A power generator 810 continues to provide energy to a power distribution network 860. This is generally transmitted to a structure 150 through an electrical panel 1010 that provides 120 VAC/220 VAC to the structure 150. While this embodiment describes transmission of electrical power, this is merely illustrated by way of example and not meant to be limiting. Other embodiments may use a power generator 810 that provides a different type of utility, such as natural gas, and a power distribution network 860 specifically designed to transmit the different type of utility to the structure 150. For electrical power, various appliances throughout the structure 150, such as a refrigerator, a washing machine, and/or household electronics may consume electrical power. In the example of natural gas, appliances such as a dryer, a stove, and/or a fireplace may consume natural gas. The structure 150 may include an HVAC system that consumes electrical and/or natural gas power. It is important to note that the HVAC system will generally only constitute a portion of the overall energy usage for the structure 150 for each energy type.

The total energy usage for the structure 150 will generally be measured by one or more meters 1008, each of which will be dedicated to a particular energy type. By simply measuring the total energy usage per type for the structure 150 using the one or more meters 1008, it is generally impossible to accurately determine how much of the total energy consumption is attributable to the operation of the HVAC system. Instantaneous household energy usage 1004 can be transmitted from the meter 1008 to the utility provider computer system 820. Meters with this capability generally operate wirelessly or through a modem connection to the utility provider computer system 820. These meters 1008 may in some cases be referred to as "smart meters."

Some embodiments of the charge guard feature require the cooperation of the utility provider computer system 820, which has access to the meter 1008. Because the thermostat alone does not have access to the total instantaneous energy usage in the structure 150, communication between the thermostat, the thermostat management server 830, the utility provider computer system 820, and the meter 108 may be required. Prior to this disclosure, customers had to know their approximate instantaneous energy thresholds, their instantaneous energy usage, and be able to take manual action with the thermostat in order to adjust their HVAC usage. Even though HVAC usage is just a single component of overall energy usage for the structure 150, heating and cooling of the structure 150 during the winter and summer months can be a predominant factor in overall energy usage. Therefore, adjusting the HVAC usage using the in-home thermostat remains an important part of reducing energy consumption during peak demand events. In some cases, the utility provider was a separate entity from the provider of the thermostat, and there was no direct way for a digital representation of the instantaneous energy usage, and/or thresholds to be transmitted directly to an intelligent thermostat. Furthermore, no existing thermostats were able to automatically adjust a setpoint schedule based on real-time demand charge information. In other words, there was a technology problem that prevented the efficient implementation of demand charge plans in modern, intelligent thermostats.

In some embodiments described herein, the term "utility provider" may refer specifically to an entity responsible for installing utility equipment at a structure. In one example, the utility provider may refer specifically to a solar power company. In some embodiments, a solar power company may install and lease solar panels to a structure. The owner of the structure may be obligated to receive energy from the solar panels and/or the solar power company. In exchange, the solar power company may sell excess energy generated by the solar panels to another utility provider with an energy grid. The algorithms described herein for operating a thermostat and/or thermostat management server may be particularly advantageous for embodiments involving a solar power company, because reducing energy usage during high-cost intervals means that there is more energy for the solar power company to sell to another utility provider. Therefore, in FIG. 10, the "utility provider" may include a plurality of different entities, including a solar panel company, a traditional power company that operates the power generator 810 and power distribution network 860, and so forth.

The embodiments described herein overcome this technology problem by providing a unique communication interface between the utility provider computer system 820 and the thermostat management server 830. A custom API 1002 is designed for the thermostat management server 830 to receive real-time information regarding the instantaneous energy usage of the household and demand charge events indicating that the instantaneous household energy usage is likely to cross a demand charge threshold. As will be described in greater detail below, the utility provider 820 can use the custom API 1002 to define one or more rate plans, and to institute bidirectional communication before, during, and after a demand charge event. In turn, the thermostat management server 830 can receive the demand charge events from the utility provider computer system 820, and store this information in a plurality of synchronization buckets. The synchronization buckets at the thermostat management server 830 are associated with a particular user account tied to an intelligent thermostat installed in the structure 150. Periodically, such as every 15 minutes, the thermostat management server 830 can synchronize the synchronization buckets in the user account at the thermostat management server 830 with corresponding synchronization buckets on the individual thermostats. This communication can be performed through a network 840, such as the Internet, where the intelligent thermostat is accessible through a home Internet router. After receiving the demand charge event information from the synchronization buckets, the intelligent thermostat can alter its setpoint temperature scheduled to dynamically account for the demand response event. The specific algorithms will be described in greater detail below.

Although not shown explicitly in FIG. 10, some embodiments may also provide direct access to the meters 1008 by the thermostat itself. In these embodiments, direct communication between the thermostat and the meters 1008 may bypass the communication through the utility provider computer system 820, the API 1002, and/or the thermostat management server 830.

Figure 11:
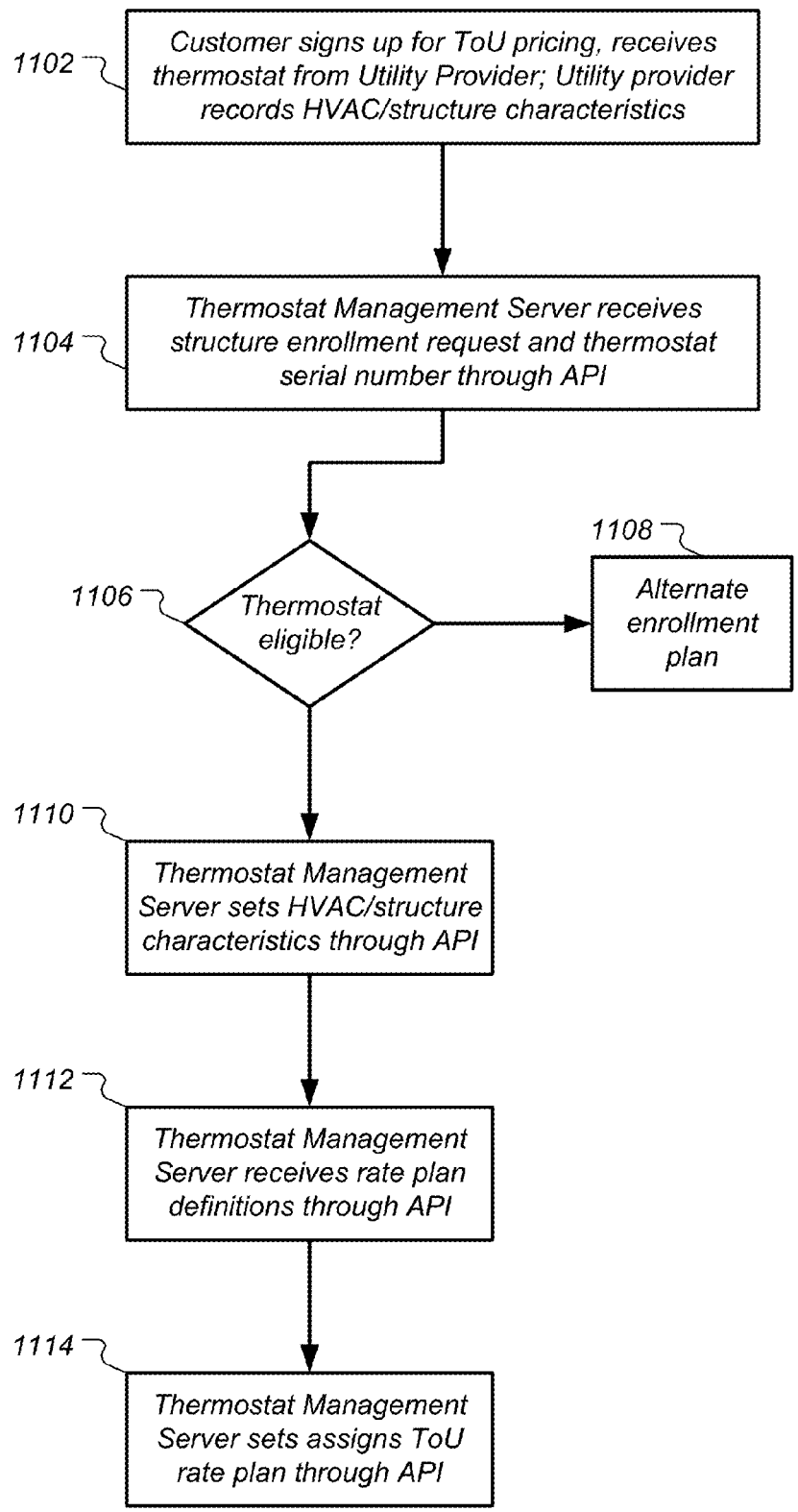
FIG. 11 illustrates a flowchart of a method for enrolling a customer in a demand charge rate plan associated with an intelligent thermostat, according to some embodiments.

In some embodiments, the process may begin with a customer signing up for a demand charge rate plan. Typically, coordinating the sign-up process between the utility provider, the thermostat provider, and the customer was a difficult process. FIG. 11 illustrates a flowchart of a method for enrolling a customer in a demand charge rate plan associated with an intelligent thermostat, according to some embodiments. The method may include providing a thermostat at or near the time that the customer signs up for a demand charge rate plan (1102). In one embodiment, the utility provider may include a solar panel installation company. During installation of solar panels, the utility company may also install an intelligent thermostat. The thermostat may be provided in a batch of thermostats from the thermostat provider to the utility provider as part of a promotion. In order to entice customers to sign up for the demand charge rate plan, the utility provider may offer the intelligent thermostat for free or for a greatly reduced price. The utility provider can record the serial number of the thermostat along with a particular demand charge rate plan that the customer agrees to. In other examples where on-site installation is not necessarily required at the structure, the utility provider can ship an intelligent thermostat to the customer when signing up for a demand charge plan. For example, a customer can log into a utility provider's website, agree to the terms and conditions of the demand charge rate plan, and afterwards the utility provider can ship the intelligent thermostat to the customer.

The method may also include using the custom API of the thermostat management server to inform the thermostat management server that the customer has enrolled in the demand charge rate plan and has a qualifying thermostat (1104). As will be described in greater detail below, the custom API may include functions that allow a utility provider computer system to identify a thermostat by serial number and indicate a selected demand charge rate plan for that thermostat. Prior to enrolling the thermostat in the rate plan, the utility provider can also define rate plans and define/adjust time intervals, rates, and thresholds for those rate plans through the API. After the thermostat is installed and the demand charge rate plan adjustments have been enabled on the thermostat, the utility provider computer system can dynamically communicate demand charge events to the thermostat management server in real-time through the API.

The method may also determine whether the thermostat is eligible for demand charge rate plan enrollment (1106). For example, the thermostat provider will typically record a list of serial numbers of thermostats provided to the utility provider. This step can check the serial number submitted through the custom API to the thermostat management server against the recorded list of eligible thermostat serial numbers. This can serve to effectively limit the number of thermostats that can be provided at free or discounted prices by the utility provider. In cases where the serial number does not match an eligible serial number, an alternative enrollment plan can be provided (1108). For example, the thermostat provider can disregard the eligibility and enroll the thermostat in the demand charge rate plan indicated by the utility provider. The thermostat provider can then require payment for the thermostat from the utility provider. Alternatively, an error message can be transmitted to the thermostat indicating that the thermostat has not been enabled for automatic demand charge event operations.

In cases where the thermostat is eligible, the thermostat management server can receive HVAC and/or structural characteristics through the API (1110). In some embodiments, the installation process by the utility provider can include a characterization of the structural and/or HVAC characteristics of the home. For example, the utility provider can estimate the square footage of the home, the thermal insulation of the home, the wattage of the HVAC system, the fuel type of the HVAC system, and so forth, in order to derive one or more HVAC characteristics and/or one or more structural characteristics for the home. This information can be used by the thermostat during the adjustment algorithm described in detail below.

The method may additionally include sending demand charge event notifications through the API (1112). Example formats for sending demand charge events through the API will be described in greater detail below. After receiving this information, the thermostat management server has enough information to activate the charge guard feature on the thermostat as will be described in greater detail below.

FIG. 12 illustrates interface definitions for the API provided to the utility provider by the thermostat management server that can be used to enroll structures and define demand charge rate plans, according to some embodiments. In this particular embodiment, the API interface may be categorized as a RESTful interface, which would be well understood by those having skill in the art. Function 1202 can be used to enroll (POST) a structure in a particular program using a particular device. For example, in the example described above, the utility provider may provide a thermostat to the customer during installation when/if the terms and conditions of the demand charge rate plan are accepted. Function 1202 can accept a program instance identifier for a particular energy partner (e.g., a particular utility provider) to identify the demand charge program. Function 1202 can also accept a unique identifier for the thermostat, such as the thermostat serial number, and the time at which the demand charge rate plan was accepted. Function 1202 can then return a structure ID that uniquely identifies the enrolled structure for the utility provider. The structure ID can be used by other API function calls described below to reference an existing enrollment.

Function 1204 can be used to unenroll (DELETE) a structure in a demand charge program. By providing the structure ID received during the enrollment process using function 1202, function 1204 can remove the structure from the demand charge rate plan.

Function 1210 allows the utility provider to set (PUT) HVAC capacities for a thermostat. As described above, the utility provider may include an HVAC assessment as part of their installation process. They can estimate the wattage of the HVAC system, the square footage of the house, the insulation properties, and so forth, in order to help the thermostat accurately predict the amount by which the temperature setpoints need to change in order to realize a threshold amount of energy savings. Function 1210 can use the device ID to identify the thermostat, assign the thermostat to a particular structure ID, and use the device serial number to assign a cooling capacity, a capacity of a primary heating method, a capacity of a secondary heating method, a fan efficiency, and/or the like, for the HVAC system.

The interface definitions illustrated by FIG. 12 can be used by the utility provider to GET/POST/PUT/DELETE information associated with the initial enrollment of a device/structure in a demand charge rate plan. FIG. 13 illustrates interface definitions for the API provided to the utility provider by the thermostat management server that can be used to define, maintain, and/or update real-time demand charge events for various structures, according to some embodiments.

Function 1302 can be used to create (POST) an initial demand charge event. The utility provider can provide a structure ID obtained earlier when registering a structure in FIG. 12, and initiate a demand charge event for a particular household. As described above, the utility provider has access to the instantaneous household energy usage for the structure, and can predict, using one or more of the methods described above, when the total instantaneous household energy usage is likely to surpass the demand charge threshold. In some embodiments, demand charge events may be detected and serviced in terms of predefined time intervals, such as 15 minute intervals. Thus, at the beginning of a first interval, the utility provider computer system can predict that a demand charge event will occur. Function 1302 can be used at the beginning of the first interval. The expectation is that the thermostat will be able to begin servicing the demand charge event near the beginning of the next time interval.

Function 1302 can also provide a projected savings amount for avoiding the demand charge event. An array can also be transmitted of time intervals associated with the demand charge event, each including a start time, an end time, a minimum energy threshold under which energy is considered to be charged at a standard rate (or free), and a maximum energy over which demand charges will be incurred. In response, function 1302 can provide the utility provider computer system with a demand charge event ID so that the demand charge event can be reference in the future.

In order to institute round-trip communication, the RESTful interface of FIG. 13 can provide a GET function that allows the utility provider computer system to retrieve information given a particular demand charge event ID. Function 1304 accepts the demand charge event ID and retrieves information about how the thermostat management server and/or the thermostat itself for that particular structure can service the demand charge event. The outputs may include event and structure IDs, the estimated savings that the thermostat can provide, and an end time of the demand charge event. The outputs may also include a Boolean value that indicates whether the thermostat has evaluated the demand charge event or not. As will be described below, the thermostat will incorporate the predicted cost of the demand charge event into a cost function that is minimized to determine how setpoint temperatures will be affected. Other factors in the cost function include a representation of user comfort. Based on this user comfort factor, it may not be possible for the thermostat to reduce HVAC usage without causing the user to be uncomfortable. When this evaluation is made, the Boolean value returned by function 1304 can be set.

In some embodiments, function 1304 can also return an evaluation result. This value can include a plurality of possible values. One value may indicate that the estimated savings can be achieved without impacting user comfort. In other words, the thermostat may determine that the temperature setpoints in the next time interval can be reduced to provide the energy savings requested by the utility provider without violating the user comfort factor. Another value may indicate that the estimated savings can be achieved, but servicing the demand response event will impact user comfort. In these cases, the thermostat can reduce HVAC energy usage enough to avoid demand charges, but doing so will affect user comfort. Another possible value to be returned is that the thermostat is unable to achieve the desired energy savings.

The thermostat can calculate energy savings because the utility provider computer system has transmitted the HVAC characteristics and structural characteristics to the thermostat. By knowing the wattage of the HVAC system and the total time that the HVAC system operation can be reduced, the thermostat can calculate a number of kilowatt hours of total energy that can be saved by reducing the setpoint temperature. The utility provider computer system can communicate in terms of energy savings because the goal may be to regulate the total energy drawn from the power grid. The utility provider computer system can then respond to homes that are unable to meet the desired energy savings by immediately requesting other homes to fill those spots.

Function 1304 can also return a status for each demand charge interval sent as part of the demand charge event. This status can indicate whether the interval is finished, still running, or was rejected by the user. In some cases, a user may take affirmative action to cancel the charge guard feature on the thermostat. For example, a user may feel too hot, and lower the setpoint temperature via the user interface of the thermostat. As will be described in greater detail below, the thermostat can inform the user that the charge guard feature is active, and allow the user to override this feature. Such an instance would lead to a status of "user rejected" being transmitted to the utility provider computer system.

Finally, at any point, the utility provider computer system can cancel a demand charge event by using the cancel demand charge event function 1306 and providing the demand charge event ID.

Function 1302 can be used to create (POST) an initial definition of a ToU rate plan. The utility provider can provide a name and description of the new ToU rate plan, along with an array of intervals. Each interval may include a start time and an end time for the interval. The interval may also include a cost, comprising a threshold (or multiplier) and a rate price associated with the interval. In some embodiments, the array of intervals provided by function 1302 may be required to be contiguous, such that the end time of one interval must be aligned with the start time of the next interval. After the definition of the ToU rate plan is received, the rate plan ID can be returned to the utility provider computer system. Recall above, that when enrolling a structure, this rate plan ID can be used by function 1206 to assign the rate plan to the structure.

Function 1304 can be used to return (GET) the definition of an existing rate plan. By providing the rate plan ID, function 1304 can return the name and description of the indicated rate plan, along with information associated with the time intervals. Function 1306 can be used to update (PUT) a rate plan, while function 1308 can be used to delete a rate plan, both of which are referenced by the rate plan ID returned when the rate plan was created by function 1302. Function 1310 can return (GET) a list of rate plans defined by the utility provider. For each rate plan, function 1310 can return the rate plan ID, the name, description, and information associated with the time intervals.

Function 1312 can be used to add (POST) time intervals to an existing rate plan. Using the rate plan ID, the utility provider can upload a new set of time intervals, each interval definition comprising a start time, and end time, and a cost in terms of a threshold/multiplier and a price for each interval. Function 1314 can be used to clear (DELETE) the time intervals in an existing rate plan. The utility provider can provide an "after time," after which any interval definitions in the existing rate plan will be deleted. Function 1314 can be used in conjunction with function 1312 to delete existing intervals, and then add replacement intervals. Finally, function 1316 can be used to return (GET) all the intervals associated with a particular rate plan. By providing the rate plan ID, the utility provider can receive all of the intervals that occurred between a designated start time and end time.

It will be understood that these API function definitions are merely examples, and are not meant to be limiting. These function definitions have been specifically designed for a ToU rate plan that is administered by a utility provider that is separate from the thermostat provider. Importantly, these API functions provide the necessary link between the utility provider and the thermostat management server necessary for the thermostat management server to instruct the intelligent thermostat to automatically make adjustments to a user schedule to accommodate ToU rate plans. This API provides a technology solution and communication link between these two computer systems that was missing prior to this disclosure.

Figure 14:
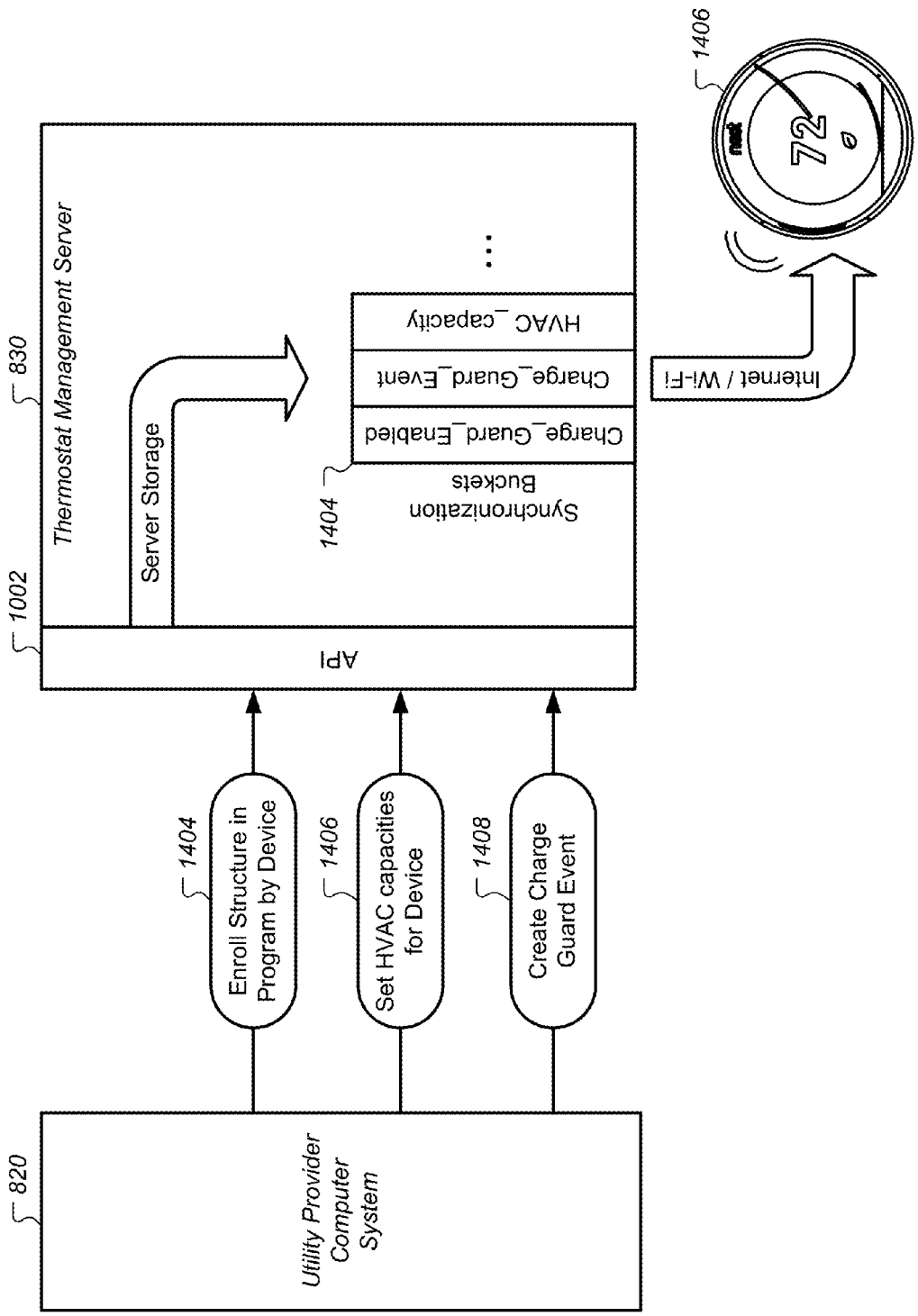
FIG. 14 illustrates a block diagram of how information is received through the API of the thermostat management server and stored in synchronization buckets for transmission to the thermostat, according to some embodiments.

FIG. 14 illustrates a block diagram of how information is received through the API of the thermostat management server and stored in synchronization buckets for transmission to the thermostat, according to some embodiments. As described above in relation to FIG. 11, the initial sign-up process for a demand charge rate plan may include providing, by the utility provider computer system 820, an instruction to enroll a structure in the demand charge program using the thermostat serial number (1404), setting the HVAC capacities for the thermostat (1406), and creating a demand charge event (1408). Each of these assignments may be made through the custom API 1002 described above.

The thermostat management server 830 can include a customer account database that stores the serial number of the thermostat, the structure ID, the rate plan ID, and/or any other information provided by the utility provider computer system 820. Each user account may also include user account information used specifically by the thermostat management server 830 to interact with the thermostat 1406. This may include MAC/IP addresses for the thermostat, and information recorded by the thermostat 1406, such as user schedules, occupancy information, temperature profiles, and so forth.

In order to simplify transmissions between the thermostat management server 830 and the thermostat 1406, information may be stored in a plurality of synchronization buckets 1404. The synchronization buckets 1404 may include a plurality of memory locations that are synchronized between the thermostat management server 830 and corresponding memory locations in a memory device of the thermostat 1406. Periodically, the thermostat 1406 may connect with the thermostat management server 1830 through the Internet or other available network to synchronize the synchronization buckets. New information provided by the thermostat management server 1830 can be downloaded to corresponding synchronization buckets on thermostat 1406, while new information recorded by the thermostat 1406 can be uploaded to corresponding synchronization buckets 1404 at the thermostat management server 830.

In some embodiments, the synchronization buckets 1404 may include a Boolean value indicating whether the charge guard feature is enabled for the thermostat 1406, a demand charge event indicator, the HVAC capacity, and so forth. It will be understood that many other synchronization buckets may also be present at the thermostat management server that are not explicitly shown in FIG. 14.

Figure 15:
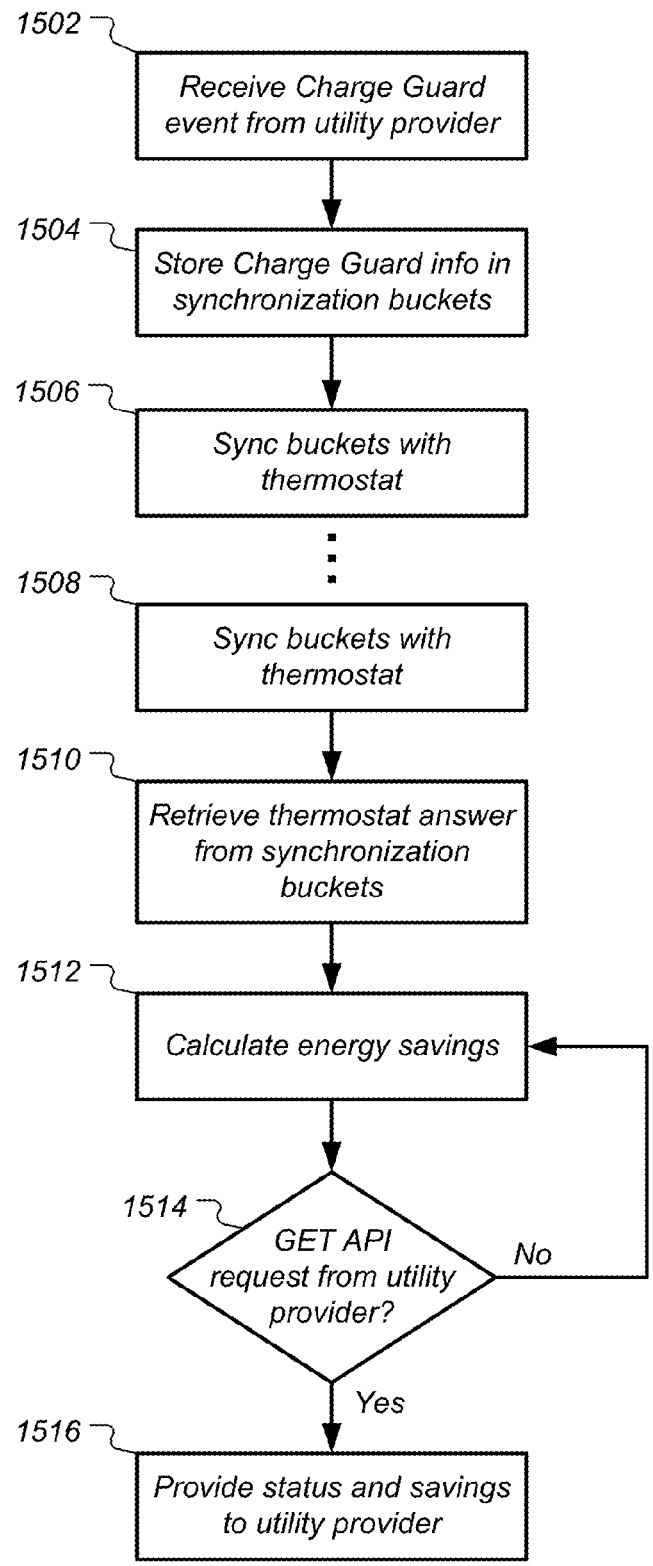
FIG. 15 illustrates a method for processing a demand charge event at a thermostat management server, according to some embodiments.

FIG. 15 illustrates a method for processing a demand charge event at a thermostat management server, according to some embodiments. The method may include receiving a demand charge event from the utility provider (1502) and storing the demand event information in synchronization buckets for an identified user account (1504). The method may also include synchronizing the buckets with the thermostat (1506). In some embodiments, the buckets may be synchronized periodically using time intervals that are less than or equal to the time intervals used by the utility provider computer system to process demand charge events. Synchronizing these buckets may be a primary way in which the demand charge event notification is transmitted to the thermostat.

At the next synchronization stage, another synchronization of the buckets may occur (1508) where a result of processing the demand charge event is transmitted back from the thermostat to the thermostat management server. This information may include results indicating energy savings, a result of the cost function minimization performed by the thermostat and described in detail below, and/or any results of user interactions during the demand charge interval. The response from the thermostat can be retrieved from the synchronization buckets (1510). In some embodiments, energy savings and/or a monetary representation of energy savings can be calculated at the thermostat management server instead of at the thermostat itself (1512).

The method may also include receiving a GET function from the utility provider computer system through the API (1514), such as function 1304 in FIG. 13. In response, the thermostat management server can provide the outputs specified in function 1304 to the utility provider computer system (1516).

Figure 16:
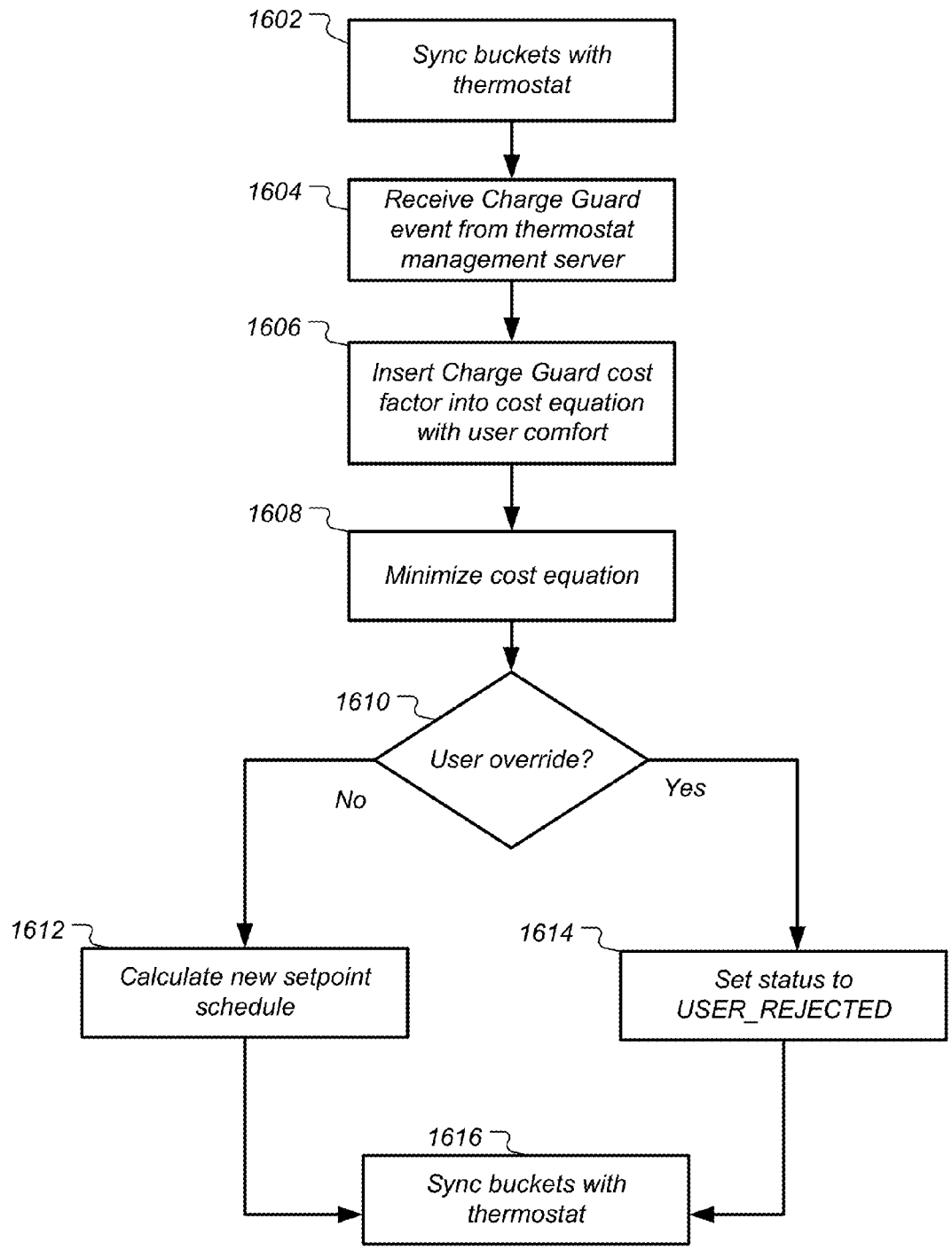
FIG. 16 illustrates a method for servicing a demand charge event by a thermostat, according to some embodiments.
Figure 17B:
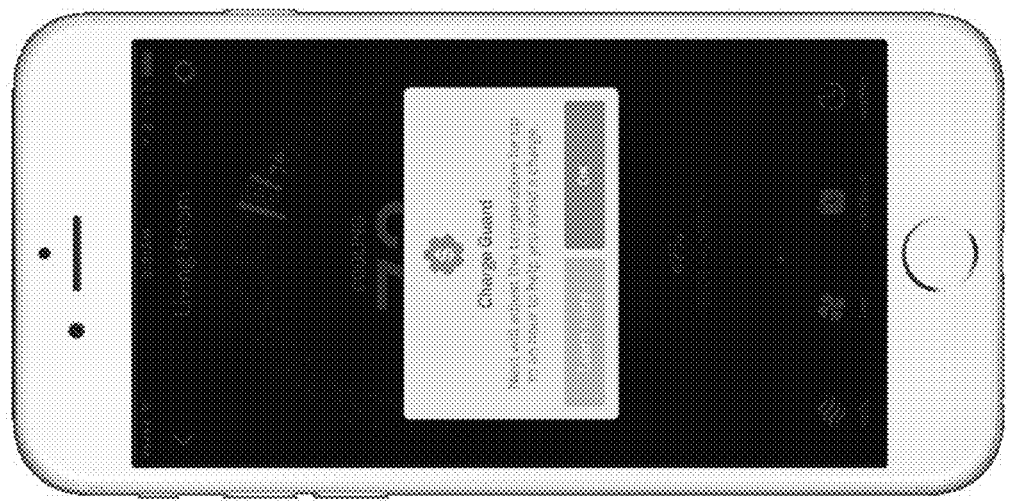
FIG. 17B illustrates a user interface that can be displayed on a mobile device, according to some embodiments.
Figure 17A:
FIG. 17A illustrates a user interface of the learning thermostat, according to some embodiments.

FIG. 16 illustrates a method for servicing a demand charge event by a thermostat, according to some embodiments. As described above, the thermostat can synchronize memory location buckets with the thermostat management server (1602). By extracting information from the synchronization buckets the thermostat can receive a definition and indication of the demand charge event from the thermostat management server (1604).

In order to incorporate the demand charge event into the adjustment of setpoint temperatures, the charge guard feature of the thermostat can add a factor to a cost function that represents the increased cost associated with not reducing HVAC usage. In order to determine an optimal series of setpoints for controlling the HVAC system during the demand charge event, the thermostat can set up a cost function comprising a number of different mathematical factors. A first factor of the cost function may represent user comfort, where a numerical value between 1.0 and 0.0 can be assigned based on a user indication of how much money they want to save versus how much comfort they are willing to sacrifice. A second factor in the cost function may represent a current setpoint temperature schedule. Another factor in the cost function may represent a cost or savings associated with a current baseline energy rate. The charge guard feature of the thermostat can add a factor representing the additional cost associated with not reducing the HVAC usage during the next subsequent interval (1606). Once these factors are set, the thermostat can, in real-time, minimize the cost function to determine an optimal set of setpoint values for the upcoming demand charge interval (1608).

In some cases, the charge guard factor in the cost function can be dominated by other factors, such as user comfort. When this happens, it is possible that the setpoint temperatures will be lower, but not lowered enough to meet the requirements of the demand charge event. The thermostat can then transmit an evaluation result of "not achievable" to the thermostat management server. In other cases, the charge guard factor will influence the minimization of the cost function sufficiently to meet the saving requirements of the demand charge event. When this happens, a determination can be made as to whether the user comfort will be impacted or not impacted. It is possible to make the user slightly uncomfortable without violating the user comfort thresholds. Accordingly, the thermostat can transmit evaluation results of "achievable with comfort impact" or "achievable without comfort impact" to the thermostat management server.

The goal of minimizing the cost function is to satisfy the demand charge event without the user noticing. In some cases, the user may notice that the HVAC system has stopped running as often. The user may manually override the charge guard feature by adjusting the setpoint temperature via the user interface of the thermostat or another computing device communicatively coupled to the thermostat. When a user override is detected (1610), a status for the current demand response interval indicating "user rejected" can be transmitted to the thermostat management server. If the cost function will allow the demand charge event to be satisfied and the user does not override the event, a new setpoint schedule can be calculated (1612) and used to control the HVAC system during the demand charge interval. The evaluation results in status indicators can be transmitted back to the thermostat management server by populating the synchronization buckets in the thermostat (1616).

FIGS. 17-20 illustrate various user interfaces that can be provided on the thermostat and/or a mobile computing device to activate, interact with, and evaluate a demand charge event. FIG. 17A illustrates a user interface of the Nest Learning Thermostat described above. After installing the thermostat and downloading the synchronization buckets from the thermostat management server indicating a particular demand charge, the thermostat can inform the customer that the charge guard function will be in effect. This user interface can be used to inform the user that the thermostat will automatically adjust setpoints in order to save money by avoiding additional charges by reducing overall instantaneous household energy usage. Additional information can be provided to a user through the "More Info" menu item. FIG. 17B illustrates a similar user interface that can be displayed on a mobile device. As described above, the Nest Learning Thermostat described above may be connected via one or more wireless networks to an app operating on a customer's smart phone device. Not only is the customer able to view the status of the thermostat and control the temperature, but the customer is also able to activate features such as the charge guard feature described herein.

Figure 18:
FIG. 18 illustrates an embodiment of a thermostat in what is referred to as a "Farsight" mode, according to some embodiments.

In some embodiments, it may be desirable to keep the user informed in real time as the charge guard adjustments to the schedule are in effect. FIG. 18 illustrates an embodiment of a thermostat in what is referred to as a "Farsight" mode, according to one embodiment. In this mode, the thermostat has not detected a user approaching the thermostat with an intent to interact with the user interface of the thermostat. Therefore, the user interface can display a larger icon or message that can be read from a great distance. In this embodiment, a charge guard icon can be used to indicate that the thermostat is currently operating more efficiently to avoid demand charges, and that the thermostat has automatically adjusted temperature setpoints during the demand charge interval to save money.

Figure 19B:
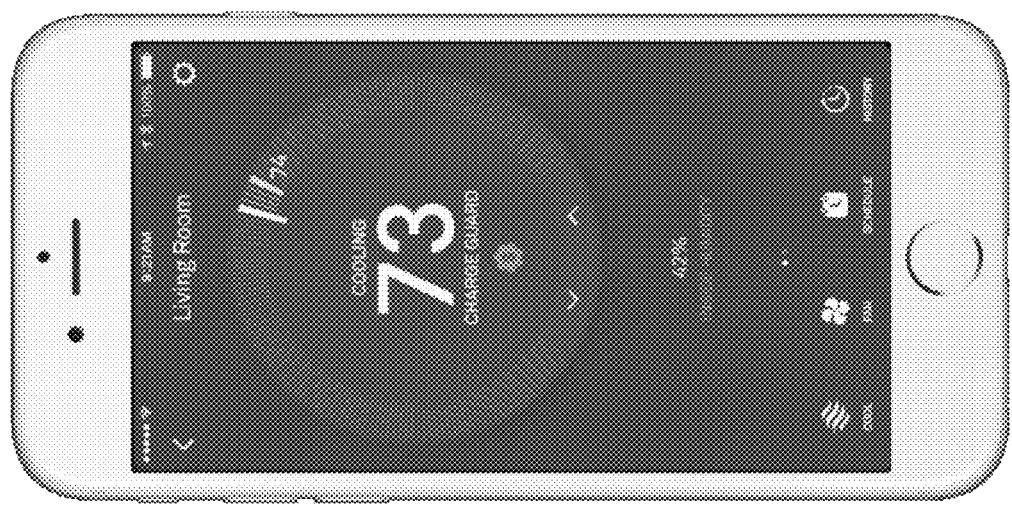
FIG. 19B illustrates a similar user interface displayed on a mobile device display.
Figure 19A:
FIG. 19A illustrates a user interface of a thermostat in an active mode while the charge guard feature is operative, according to some embodiments.

FIG. 19A illustrates a user interface of a thermostat in an active mode while the charge guard feature is operative, according to some embodiments. The features of the depicted user interface, such as the "cooling" indicator, the current temperature, and the target temperature with the dial around the exterior of the interface, are all existing features of the thermostat. These features may be displayed when a user approaches the thermostat with an intent to interact with the user interface. When the charge guard function is active, the "Charge Guard" text can be displayed with the charge guard icon from the Farsight interface described above. This serves to indicate to the user that the charge guard function is active, and that any adjustment of the setpoints will disrupt the cost savings that would otherwise be realized by the charge guard function. FIG. 19B illustrates a similar user interface displayed on a mobile device display.

Figure 20B:
FIG. 20B illustrates a user interface that may be displayed when the charge guard function is available but not active.
Figure 20A:
FIG. 20A illustrates a user interface that may be displayed when a user attempts to adjust the temperature setting while the charge guard function is active, according to some embodiments.

FIG. 20A illustrates a user interface that may be displayed when a user attempts to adjust the temperature setting while the charge guard function is active, according to some embodiments. This user interface may be referred to as a "speedbump" that forces the user to consider the ramifications of a temperature adjustment. If the user continues to adjust the temperature after the speedbump, the charge guard feature can be turned off. FIG. 20B illustrates a user interface that may be displayed when the charge guard function is available but not active. In this user interface, the "Charge Guard" text indicator may still be displayed, thereby indicating that the charge guard function is available and that the energy rate is currently in a high-cost area of total instantaneous household energy usage. However, the charge guard icon may be removed indicating that the charge guard function is not currently operating due to the user temperature adjustments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A thermostat comprising:
   a housing;
   one or more memory devices comprising a stored setpoint schedule, wherein the stored setpoint schedule comprises a plurality of setpoints;
   one or more temperature sensors, each of the one or more temperature sensors being configured to provide temperature sensor measurements;
   a processing system disposed within the housing, the processing system being configured to be in operative communication with the one or more temperature sensors to receive the temperature sensor measurements, in operative communication with the one or more memory devices to determine a setpoint temperature, and in still further operative communication with a heating, ventilation, and air conditioning (HVAC) system to control the HVAC system based at least in part on the setpoint temperature and the temperature sensor measurements;
   wherein the processing system is programmed or configured to control the HVAC system by performing operations comprising:
      receiving an indication that a total instantaneous energy usage rate for a structure in which the thermostat is installed is projected to exceed a threshold amount;
      altering the stored setpoint schedule to reduce an energy usage rate of the HVAC system in response to receiving the indication that the total instantaneous energy usage rate for the structure in which the thermostat is installed is projected to exceed the threshold amount; and
      controlling the HVAC system using the altered setpoint schedule.

2. The thermostat of claim 1, wherein the indication that the total instantaneous energy usage rate for the structure in which the thermostat is installed is projected to exceed the threshold amount comprises a time interval defined by a start time and an end time during which the total instantaneous energy usage rate is projected to exceed the threshold amount.

3. The thermostat of claim 2, wherein the processing system is further programmed or configured to control the HVAC system by performing further operations comprising:
   receiving a request to reduce the total instantaneous energy usage rate for the structure by a specified amount during the time interval.

4. The thermostat of claim 3, wherein the processing system is further programmed or configured to control the HVAC system by performing further operations comprising:
   determining whether the thermostat can reduce the total instantaneous energy usage rate for the structure by the specified amount during the time interval by multiplying an HVAC capacity by an amount of time during the time interval that the HVAC system can be turned off; and
   sending a response indicating whether the thermostat can reduce the total instantaneous energy usage rate for the structure by the specified amount during the time interval.

5. The thermostat of claim 4, wherein the response indicating whether the thermostat can reduce the total instantaneous energy usage rate for the structure comprises an indication that the thermostat can reduce the total instantaneous energy usage rate for the structure without affecting user comfort.

6. The thermostat of claim 4, wherein the response indicating whether the thermostat can reduce the total instantaneous energy usage rate for the structure comprises an indication that the thermostat can reduce the total instantaneous energy usage rate for the structure but only while affecting user comfort.

7. The thermostat of claim 1, wherein the processing system is further programmed or configured to control the HVAC system by performing further operations comprising:
   minimizing a cost equation comprising a plurality of cost factors to determine whether the thermostat can reduce the total instantaneous energy usage rate for the structure by the specified amount during the time interval.

8. The thermostat of claim 7, wherein one of the plurality of cost factors comprises a user comfort factor that is stored locally at the thermostat, and received through a user interface of the thermostat.

9. The thermostat of claim 7, wherein one of the plurality of cost factors comprises an additional cost that is incurred for exceeding the threshold amount.

10. The thermostat of claim 1, wherein the processing system is further programmed or configured to control the HVAC system by performing further operations comprising:
    receiving input from a user that increases the instantaneous energy usage of the HVAC system; and
    removing any alterations made to the stored setpoint schedule in response to receiving the indication that the total instantaneous energy usage rate for the structure in which the thermostat is installed is projected to exceed the threshold amount.

11. A method of using a thermostat to control an HVAC system, the method comprising:
storing a stored setpoint schedule in one or more memory devices, wherein the stored setpoint schedule comprises a plurality of setpoints;
receiving temperature sensor measurements from one or more temperature sensors;
controlling an air conditioning (HVAC) system based at least in part on the stored setpoint schedule and the temperature sensor measurements;
receiving an indication that a total instantaneous energy usage rate for a structure in which the thermostat is installed is projected to exceed a threshold amount;
altering the stored setpoint schedule to reduce an energy usage rate of the HVAC system in response to receiving the indication that the total instantaneous energy usage rate for the structure in which the thermostat is installed is projected to exceed the threshold amount; and
controlling the HVAC system using the altered setpoint schedule.

12. The method of claim 11, wherein the indication that the total instantaneous energy usage rate for the structure in which the thermostat is installed is projected to exceed a threshold amount is received from a thermostat management server.

13. The method of claim 11, wherein the indication that the total instantaneous energy usage rate for the structure in which the thermostat is installed is projected to exceed a threshold amount originates with a utility provider, and is transmitted to a thermostat management server via a custom application programming interface (API).

14. The method of claim 13, wherein the utility provider comprises a solar panel provider, wherein the utility provider has installed one or more solar panels at a structure in which the thermostat is installed.

15. The method of claim 14, further comprising receiving, from the thermostat management server, an HVAC capacity, wherein the HVAC capacity is measured by the solar panel provider when the solar panels are installed at the structure.

16. The method of claim 15, wherein the total instantaneous energy usage rate for a structure is measured by a meter coupled to the solar panels.

17. The method of claim 11, further comprising displaying a first graphic on a user interface of the thermostat indicating that a thermostat feature is available to prevent the total instantaneous energy usage rate for the structure from exceeding the threshold amount.

18. The method of claim 17, further comprising displaying a second graphic on the user interface of the thermostat indicating that the thermostat feature is currently active to prevent the total instantaneous energy usage rate for the structure from exceeding the threshold amount.

19. The method of claim 11, further comprising:
receiving a request to reduce the total instantaneous energy usage rate for the structure by a specified amount during a time interval;
determining whether the thermostat can reduce the total instantaneous energy usage rate for the structure by the specified amount during the time interval by multiplying an HVAC capacity by an amount of time during the time interval that the HVAC system can be turned off; and
sending a response indicating whether the thermostat can reduce the total instantaneous energy usage rate for the structure by the specified amount during the time interval.

20. The method of claim 11, further comprising:
minimizing a cost equation comprising a plurality of cost factors to determine whether the thermostat can reduce the total instantaneous energy usage rate for the structure by the specified amount during the time interval, wherein:
one of the plurality of cost factors comprises a user comfort factor that is stored locally at the thermostat, and received through a user interface of the thermostat; and
one of the plurality of cost factors comprises an additional cost that is incurred for exceeding the threshold amount.

* * * * *